United States Patent
Saito et al.

(10) Patent No.: US 8,120,824 B2
(45) Date of Patent: Feb. 21, 2012

(54) IMAGE FORMING APPARATUS AND IMAGE FORMING METHOD

(75) Inventors: Daijiro Saito, Hachioji (JP); Takeshi Yoshino, Hino (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 765 days.

(21) Appl. No.: 12/267,002

(22) Filed: Nov. 7, 2008

(65) Prior Publication Data

US 2009/0122368 A1  May 14, 2009

(30) Foreign Application Priority Data

Nov. 13, 2007 (JP) ................................. 2007-294504
Dec. 27, 2007 (JP) ................................. 2007-337304

(51) Int. Cl.
 *H04N 1/04* (2006.01)
(52) U.S. Cl. .......... 358/504; 358/1.9; 358/1.1; 358/1.18
(58) Field of Classification Search .................. 358/504, 358/1.9, 1.1, 1.18, 1.6
 See application file for complete search history.

(56) References Cited

U.S. PATENT DOCUMENTS 7,734,220 B2 * 6/2010 Oohara ......................... 399/167

FOREIGN PATENT DOCUMENTS

| JP | 07-225544 A | 8/1995 |
| JP | 2000-089640 A | 3/2000 |
| JP | 2005-284019 A | 10/2005 |

* cited by examiner

*Primary Examiner* — Houshang Safaipour
(74) *Attorney, Agent, or Firm* — Buchanan Ingersoll & Rooney PC

(57) ABSTRACT

An image forming apparatus including: an image forming section which forms an image on a photosensitive drum based on a reference signal which being an image write control signal of a predetermined cycle; a measuring section which detects a rotational velocity of the photosensitive drum and measures a velocity fluctuation distribution in time period of one rotation of the drum; a storage section which stores a correction value as a correction data table for each type of recording sheets, wherein the correction value is obtained based on the velocity fluctuation distribution; and a control section which corrects the cycle of the reference signal by referring the correction data table corresponding to a selected type of recording sheets, and controls the image forming section to form the image on the photosensitive drum based on the reference signal with the corrected cycle.

14 Claims, 19 Drawing Sheets

CONFIGURATION EXAMPLE OF COLOR PRINTER 100/200 AS AN EMBODIMENT

EXAMPLE OF PHOTOSENSITIVE DRAM ARRANGEMENT AND SETTING EXAMPLE OF ITS PITCH ARRANGEMENT p: 153mm

SETTING EXAMPLE OF EXPOSURE POSITION Qy
WITH RESPECT TO TRANSFER POSITION Py

Py: TRANSFER POSITION

VELOCITY FLUCTUATION EXAMPLE OF
PHOTOSENSITIVE DRUM 1Y

CORRECTION EXAMPLE OF ANGLE ERROR FOR PHOTOSENSITIVE DRUM OF EACH IMAGE FORMING COLOR
FIG. 6 (A)
| SAMPLE No. | No. 1 | No. 2 | No. 3 | No. 4 ··· |
FIG. 6 (B)
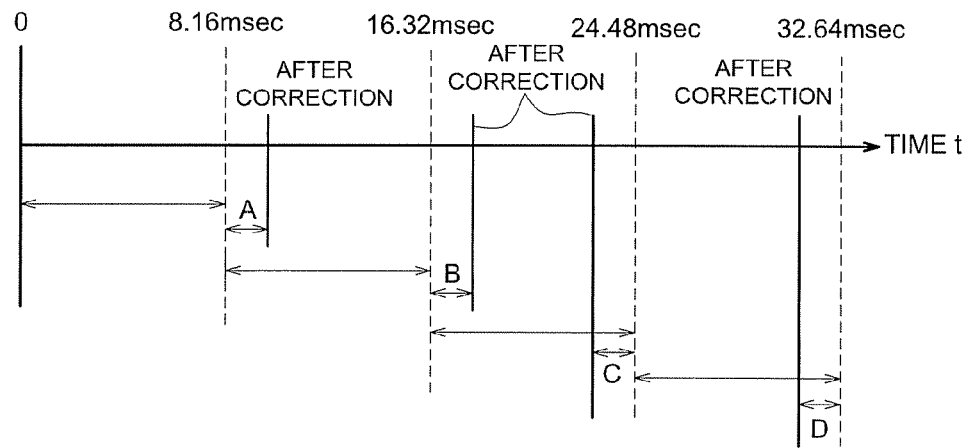
FIG. 6 (C)
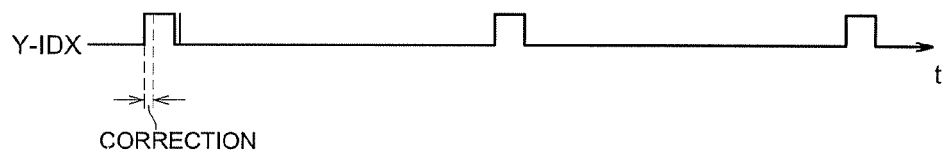
FIG. 6 (D)
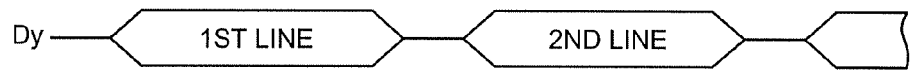

EXAMPLE OF ROTATIONAL VELOCITY FLUCTUATION IN ONE CYCLE OF PHOTOSENSITIVE DRUM 1M etc

FIG. 12 (A) CYCLE CORRECTION EXAMPLE OF REFERENCE INDEX SIGNAL

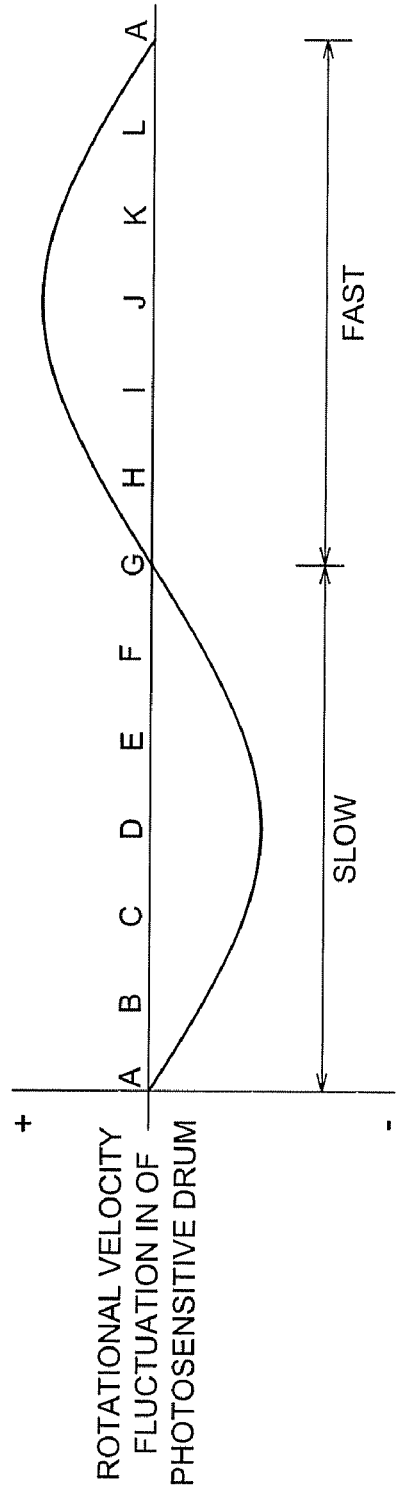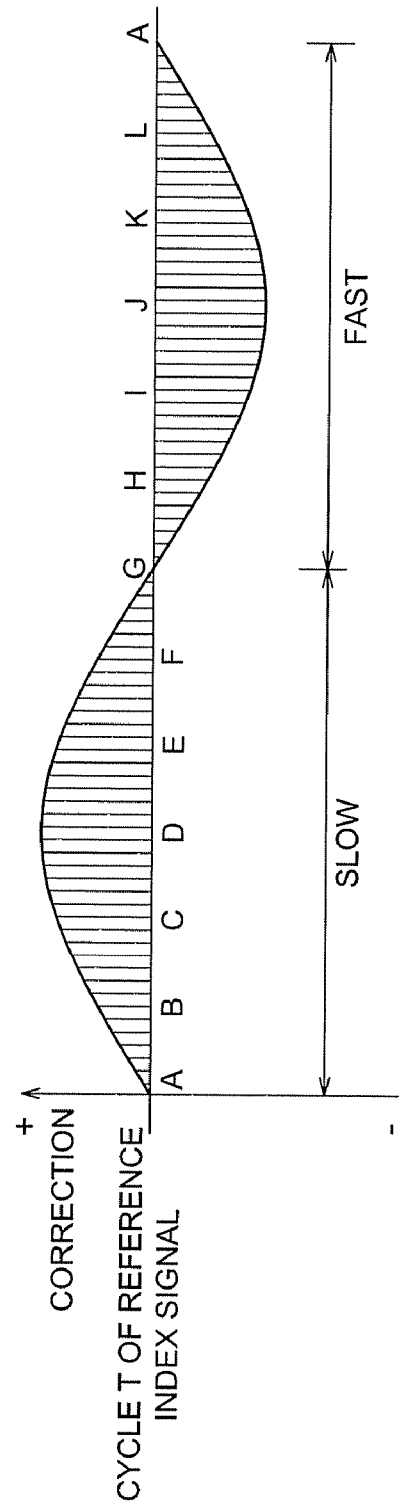
FIG. 13 (A) CYCLE CORRECTION EXAMPLE OF REFERENCE INDEX SIGNAL
FIG. 13 (B)

CYCLE CORRECTION OF REFERENCE
INDEX SIGNAL (1ST EXAMPLE)
FIG. 14 (A) CLK
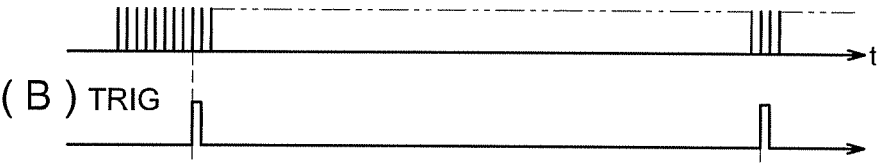
FIG. 14 (B) TRIG
FIG. 14 (C)
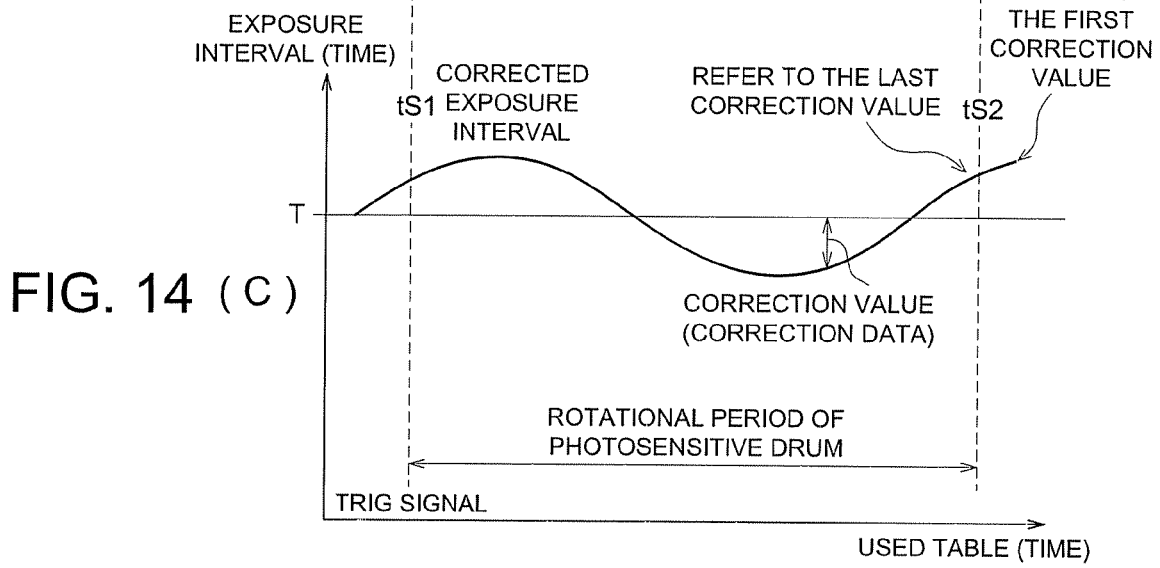

CYCLE CORRECTION OF REFERENCE INDEX SIGNAL (2ND EXAMPLE)

CYCLE CORRECTION OF REFERENCE INDEX SIGNAL (3RD EXAMPLE)

FIG. 18 (A) TRIG SIGNAL
FIG. 18 (B) NUMBER AGREEMENT SIGNAL S1
FIG. 18 (C) COUNTER VALUE "Qx"
FIG. 18 (D) ADDRESS ERROR SIGNAL S3
FIG. 18 (E) Y-IDX SIGNAL
FIG. 18 (F) COUNTER VALUE "Px"
FIG. 18 (G) NUMBER AGREEMENT SIGNAL S1
FIG. 18 (H) COUNTER VALUE "Qx"

FIG. 19 EXAMPLE OF REFERENCE CYCLE CORRECTION AND EXPOSURE CONTROL AS A THIRD EMBODIMENT

IMAGE FORMING APPARATUS AND IMAGE FORMING METHOD

CROSS REFERENCE TO RELATED APPLICATION

This application is based on Japanese Patent Application No. 2007-294504 and No. 2007-337304 respectively filed on Nov. 13, 2007 and Dec. 27, 2007 with Japanese Patent Office, the entire content of which is hereby incorporated by reference.

BACKGROUND OF THE INVENTION

1. Technical Field

The present invention relates to an image forming apparatus and image forming method applicable to a tandem system color printer, color photocopier or multi-functional peripheral which is provided with a photosensitive drum for providing collective exposure of an electrostatic latent image, by a unit of line, from a LED print head unit wherein light sources are arranged linearly for each image forming color, whereby a colored image is formed by superimposition of colors on an intermediate transfer belt.

2. Description of Related Art

A tandem system color printer, a color photocopier and the related color multi-functional peripheral have come into widespread use in recent years. In this type of image forming apparatus, when the red (R), green (G) and blue (B) of a colored image are to be reproduced, an LPH (Line Photo diode Head) unit equipped with laser light sources arranged linearly to provide collective exposure for each line is provided for each image forming color, and the toner images of yellow (Y), magenta (M), cyan (C) and black (BK) are formed by the photosensitive drums for respective image forming colors, whereby toner images of various colors formed by photosensitive drums for colors are superimposed on an intermediate transfer belt. Color toner images superimposed on the intermediate transfer belt are transferred to a desired sheet of paper and are ejected after being fixed.

In the tandem system color image forming apparatus, if there is a fluctuation (irregularity) in the rotational velocity of a photosensitive drum, the printed image may become irregular, and color misregistration and line misregistration may occur to the colored image formed by superimposition of single colors by respective image forming units in some cases.

In connection with the aforementioned tandem system color printer, JP2000-089640A (Japanese Unexamined Patent Application Publication No. 2000089640 (FIG. 1 on page 3)) discloses an image forming apparatus. This image forming apparatus includes a rotating operation detecting device, signal filter and write timing control device. When correcting the rotational irregularity of the photosensitive drum, the rotational irregularity of the photosensitive drum is detected by the rotating operation detecting device and the rotational irregularity detection signal is outputted to a signal filter. The signal filter picks up the low frequency component signals after repetitive components have been removed from the uneven rotation detecting signal, and the low frequency component signals are outputted to a write timing control device. The aforementioned low frequency component signals have been produced by drum eccentricity. The write timing control device calculates the rotational fluctuation amount from the low frequency component signals, and the image write timing of a write unit is determined based on this rotational fluctuation amount. The image forming apparatus constituted in this manner ensures accurate and speedy correction of the rotational irregularity of the photosensitive drum.

In the sheet conveyance control apparatus of the image forming apparatus shown in JP2005-284019A (Japanese Unexamined Patent Application Publication No. 2005-284019 (FIG. 2 on pages 6 to 7)), a loop sensor flag rocked by being pushed by the conveyed sheets, and a plurality of loop sensors (photo interrupters) for sensing the flag being rocked are provided around a fixing inlet conveyance guide. The magnitude of the loop of the conveyed sheets are detected in gradations at least two positions. This structure allows tough sheets to be conveyed with the loop amount kept smaller, and permits less tough sheets to be conveyed with the loop amount kept greater. This arrangement minimizes pulling or pushing of sheets by a conveyance belt of static suction and a fixing apparatus, and provides high-quality printing with the minimized color misregistration.

JP1995225544A (Japanese Unexamined Patent Application Publication No. Hei. 7-225544 (FIG. 1 on page 6)) discloses an image forming apparatus as the aforementioned tandem system color printer. In this image forming apparatus, a photosensitive drum is provided for each image forming color and a plurality of photosensitive drums are belt-driven by one drive source. The shaft of each photosensitive drum is equipped with an encoder (velocity detecting device). The fluctuation in the rotational movement anticipated from the rotational velocity information obtained from each axis is stored in advance and the record timing is controlled based on this rotational movement. The aforementioned structure of the image forming apparatus eliminates the possibility of color misregistration when the colors are superimposed on the intermediate transfer member.

The aforementioned image forming apparatus of the conventional art has a problem in that color misregistration or line misregistration has occurred to the image formed on the transfer paper due to the fluctuation in the rotational velocity of the photosensitive drum. One of the solution to this problem is to adopt the rotation detecting system of JP2000-089640A, wherein a phase detecting sensor is used for sequential phase adjustment between the color photosensitive drum shaft and monochromatic photosensitive drum shaft.

In actual practice, however, the rotational velocity of the photosensitive drum is also affected by the load fluctuation resulting from passage of sheets. For example, for thick or large-sized sheets with greater frictional force, the load is increased and the rotational velocity of the photosensitive drum is reduced. Conversely, for thin or small-sized sheets with smaller frictional force, the load is decreased and the rotational velocity of the photosensitive drum is increased.

One of the ways to correct the adverse effect of the passage of sheets is to use the image forming apparatus disclosed in JP2005-284019A. In this image forming apparatus, the sheets are classified into four stages, for example, according to the size of the loop and adjustment is made in four stages. This makes it difficult to achieve accurate correction in response to the fluctuation in the rotational velocity of the photosensitive drum.

In these examples of conventional art, a correction value is obtained while an image is actually formed on paper. When images are formed on a plurality of transfer members on a continuous basis, there may be a delay of at least one sheet in the feedback of the correction value. Alternatively, this requires measurement to get the correction value in conformity to the type of sheets having been modified, with the result that the image formation time as a whole is prolonged.

The object of the present invention is to solve the aforementioned problems and to provide an image forming apparatus and image forming method wherein a high-quality image can be formed on a plurality of types of transfer members having different size, material, frictional force and others, and continuous formation of high-quality images is provided without the time being prolonged, when images have been formed on a plurality of types of transfer members have been on a continuous basis.

In the tandem system color image forming apparatus, the rotating operation of the photosensitive drum and exposure operation of the LPH unit are asynchronously controlled. When the irregular fluctuation in the drum rotational velocity is removed, the rotational velocity fluctuation distribution of the photosensitive drum is measured, and reference is made to the amount of correction that offsets this rotational velocity fluctuation distribution, whereby the image write reference signal (reference index signal) is corrected.

However, even if the reference index signal is corrected at the cycle of canceling the irregularity in rotational velocity fluctuation, there is concern about the possibility that correction is disabled when the time period of one rotation of the drum is prolonged due to the processing (image formation) conditions such as the type of sheets.

Incidentally, in the image forming apparatus disclosed in JP2000-089640A and JP2005-284019A, the amount of correction that cancels the irregularity in rotational velocity fluctuation of the photosensitive drum is calculated prior to formation of an image so that a correction data table is created. When an image is formed, the amount of correction in this correction data table is referenced, and the image write reference signal is corrected. If this method is adopted, there may be a shortage in correction data in some case.

In this case, one round cycle of drum is divided into "n" parts and the velocity fluctuation distribution is measured. Although "n" correction values corresponding to "n" blocks have been created on the correction data table, the rotational velocity of the photosensitive drum is reduced by a change in the image forming conditions such as the type of sheets at the time of forming an image. Thus, even if all the "n" pieces of correction data are referenced in time period of one rotation of the drum, referencing in one round cycle of drum does not terminate, and an attempt is made to reference the (n+1)th correction value which is actually non-existent. Such a problem may arise in this case.

Patent Documents JP2000-089640A and JP1995-225544A use the method of correlating the exposure interval with the drum rotational velocity. There is no solution to the problem of an operation error wherein there is a shortage of correction data. Consideration is not given to an error system wherein the number of factors in the correction data for referencing is exceeded. Thus, JP2000-089640A and JP1995-225544A fail to keep the irregularity of an image within the range of the irregularity in rotational velocity fluctuation.

The present invention solves the aforementioned problems. Thus, the object of the present invention is to provide an image forming apparatus and image forming method capable of keeping the irregularity of an image within the range of the irregularity in rotational velocity fluctuation, without any correction failure even if one round cycle of drum has been prolonged by image forming conditions.

SUMMARY OF THE INVENTION

To solve the aforementioned problems, an image forming apparatus reflecting one aspect of the present invention includes:

an image forming section which forms an image on a photosensitive drum based on a reference signal, the reference signal being an image write control signal of a predetermined cycle;

a measuring section which detects a rotational velocity of the photosensitive drum and measures a velocity fluctuation distribution in time period of one rotation of the drum;

a storage section which stores a correction value in time period of one rotation of the drum as a correction data table for each type of recording sheets, wherein the correction value is obtained for each type of recording sheets based on the velocity fluctuation distribution in time period of one rotation of the drum measured by the measuring section; and a control section which corrects the cycle of the reference signal by referring the correction data table corresponding to a selected type of recording sheets, and controls the image forming section to form the image on the photosensitive drum based on the reference signal with the corrected cycle.

To solve the aforementioned problems, the image forming apparatus reflecting another aspect of the present invention is an image forming apparatus for forming an image based on a reference signal which being an image write control signal of a predetermined cycle, the image forming apparatus including:

a measuring section which detects a rotational velocity of an image carrying member, and measures a velocity fluctuation distribution of the image carrying member in time period of one rotation for each of blocks obtained by dividing one round of the image carrying member into "n" blocks;

a storage section which stores a correction value obtained for each of the blocks in a correction data table associating each of the blocks with the correction value, wherein the correction value is obtained based on the velocity fluctuation distribution of the image carrying member in time period of one rotation measured by the measuring section;

a signal creating section which refers the correction data table stored by the storage section, corrects a reference cycle of the reference signal based on the correction value for each of the blocks, and outputs the reference signal with the corrected cycle;

an image forming section which forms an image by setting the reference signal with the corrected cycle for each of the blocks, the reference signal being outputted from the signal creating section; and a control section which compares the number of the correction values in the correction data table stored in the storage section with the number of the correction values in the correction data table to be referred in time period of one rotation of the image carrying member, and based on a result of the comparison, controls the signal creating section to set the output of the reference signal with the corrected cycle or to set the output of the reference signal with the reference cycle.

To solve the aforementioned problems, the image forming apparatus reflecting still another aspect of the present invention is an image forming apparatus for forming an image based on a reference signal which being an image write control signal of a predetermined cycle, the image forming apparatus including:

a measuring section which detects a rotational velocity of an image carrying member, and measures a velocity fluctuation distribution of the image carrying member in time period of one rotation for each of blocks obtained by dividing one round of the image carrying member into "n" blocks;

a storage section which stores a correction value obtained for each of the blocks in a first correction data table associating each of the blocks with the correction value, wherein the correction value is obtained based on the velocity fluctuation distribution of the image carrying member in time period of one rotation measured by the measuring section, and stores a second correction data table where an auxiliary correction value is associated with a virtual block;

a signal creating section which refers to the first correction data table stored by the storage section, corrects a reference cycle of the reference signal based on the correction value for each of the blocks, and outputs the reference signal with the corrected cycle;

an image forming section which forms an image by setting the reference signal with the corrected cycle for each of the blocks, the reference signal being outputted from the signal creating section; and a control section which compares the number of the correction values in the first correction data table stored in the storage section with the number of the correction values in the correction data table to be referred in time period of one rotation of the image carrying member, and in cases where the number of the correction values in the first correction data table is less than the number of the correction values in the correction data table to be referred in time period of one rotation of the image carrying member as a result of the comparison, controls such that the signal creating section refers the second correction data table in succession to the first correction data table, and switches from the reference signal with a first corrected cycle corrected based on the first correction data table to the reference signal with a second corrected cycle corrected based on the auxiliary correction value in the second correction data table.

BRIEF DESCRIPTION OF THE DRAWINGS

These and other objects, advantages and features of the invention will become apparent from the following description thereof taken in conjunction with the accompanying drawings in which:

FIGS. 6(A)-(D) are derivation examples of each velocity error for photosensitive drum of each image forming color;

FIGS. 13 (A) and (B) are diagrams showing an example of cycle correction of the reference index signal for cancellation of the irregularity in the rotational velocity of the photosensitive drum 1M and others;

FIGS. 14 (A) through (C) are waveform diagrams showing the cycle correction example (First example) of the reference index signal in the exposure interval control section 50;

DETAILED DESCRIPTION OF THE PREFERRED EMBODIMENTS

Referring to drawings, the following describes an image forming apparatus and image creating method as an embodiment of the present invention:

First Embodiment

Figure 1:
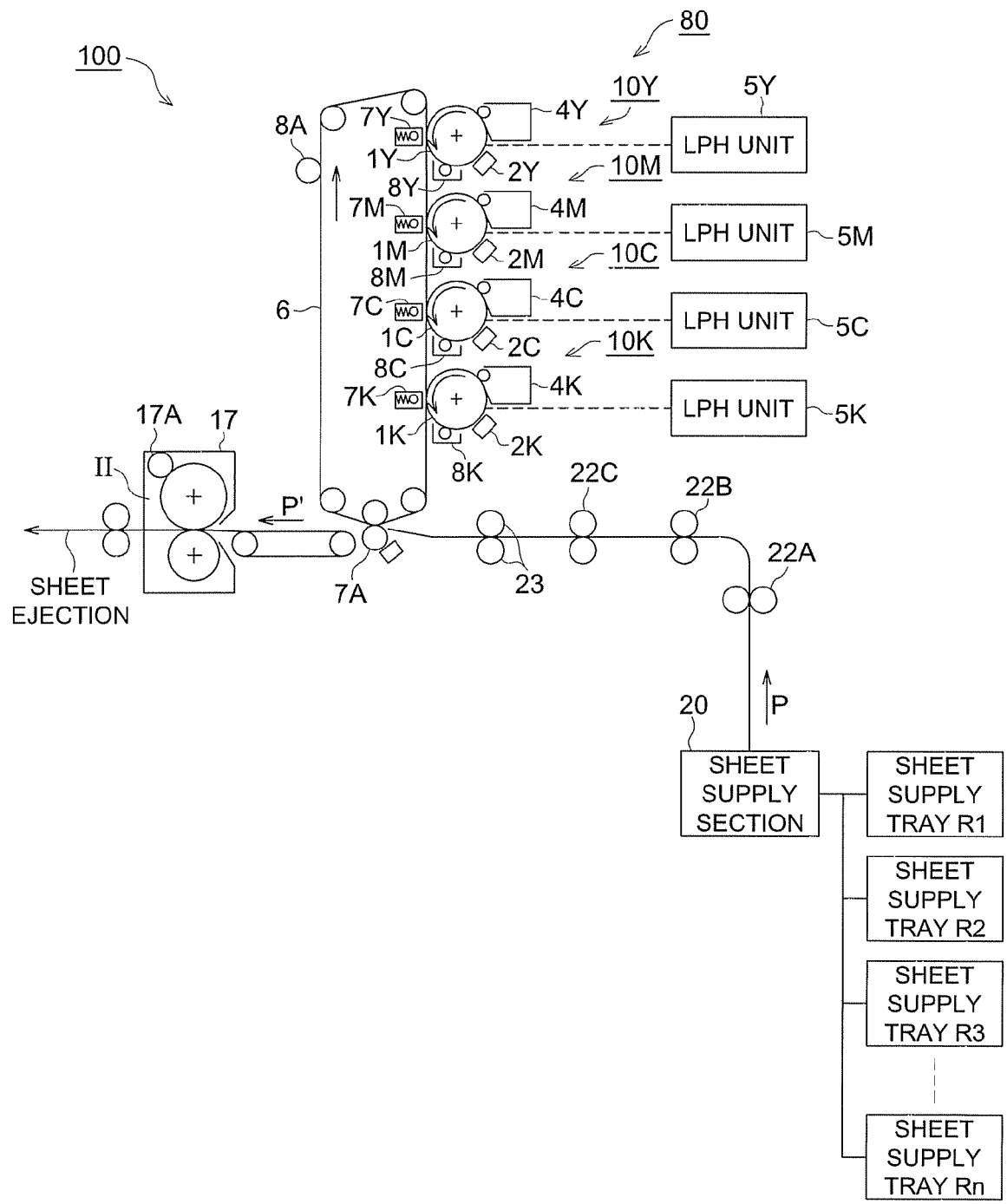
FIG. 1 is a conceptual diagram representing a configuration example of a color printer 100/200 as embodiments of the present invention.

FIG. 1 is a conceptual diagram representing a configuration example of a color printer 100 as a first embodiment of the present invention. The tandem type color printer 100 shown in the diagram constitutes an example of the image forming apparatus. It drives the photosensitive drums 1Y, 1M, 1C and 1K according to the digital colored image information, forms an image on each photosensitive drum and transfers it onto the intermediate transfer belt 6. The image having been transferred onto the intermediate transfer belt 6 is transferred onto various forms of paper (transfer member) P, and is fixed thereon.

The color printer 100 forms an image on the photosensitive drum at time intervals of image formation in response to the image write control signal. In this example, the index signal for each type of sheets obtained by correcting the index signal of reference cycle (hereinafter abbreviated as "reference index signal) in conformity to the type of paper P will be used as the image write control signal:

The colored image information is supplied to the printer 100 from an external apparatus such as a personal computer, and is sent to the image forming section 80. The image forming section 80 constitutes an example of the image forming device. It includes an image forming unit 10Y containing a photosensitive drum 1Y for yellow (Y) color; an image forming unit 10M containing a photosensitive drum 1M for magenta (M) color; an image forming unit 10C containing a photosensitive drum 1C for magenta cyan (C) color; an image forming unit 10K containing a photosensitive drum 1K for black (K) color; and an endless intermediate transfer belt 6. The image forming section 80 forms an image for each of the photosensitive drums 1Y, 1M, 1C and 1K, and the toner images of various colors formed by the photosensitive drums 1Y, 1M, 1C and 1K are superimposed on the intermediate transfer belt 6, whereby a colored image is formed.

Figure 2:
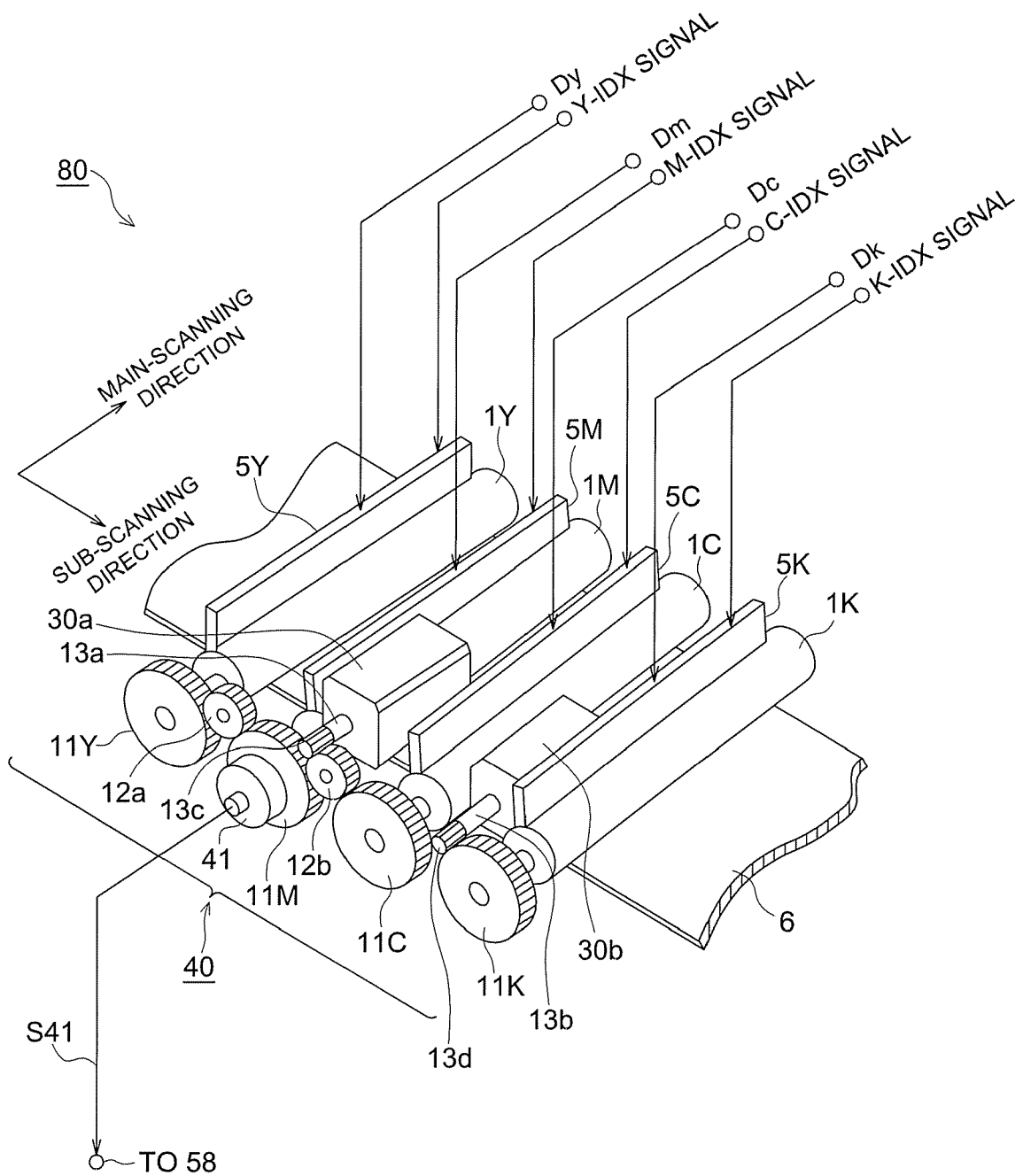
FIG. 2 is a perspective view representing a configuration example of an image forming section 80.

In this example, the image forming unit 10Y includes a charging device 2Y, linear optical head (Line Photo diode Head; hereinafter abbreviated as "LPH unit 5Y"), development unit 4Y and cleaning device 8Y for image formation, in addition to the photosensitive drum 1Y, whereby a yellow (Y) image is formed. The photosensitive drum 1Y constitutes an example of the image carrying member. For example, it is provided rotatably in close proximity to the right top of the intermediate transfer belt 6, whereby a Y-color toner image is formed. In this example, the photosensitive drum 1Y is rotated in the counterclockwise direction by the rotation transmission mechanism 40 as shown in FIG. 2. A charging device 2Y is installed obliquely to the lower right of the photosensitive drum 1Y, and charges the surface of the photosensitive drum 1Y to a predetermined potential.

Just beside the photosensitive drum 1Y, an LPH unit 5Y is mounted opposite to the photosensitive drum 1Y. It collectively irradiates a laser beam to the pre-charged photosensitive drum 1Y, wherein this laser beam has a predetermined strength in conformity to the Y-color image data. The LPH unit 5Y to be used is provided with the LED heads (not illustrated) arranged linearly. Instead of the LPH unit, a scanning exposure system using a polygon mirror (not illustrated) can be employed in the image write system. The Y-color electrostatic latent image is formed on the photosensitive drum 1Y.

A development unit 4Y is mounted over the LPH unit 5Y, and develops the Y-color electrostatic latent image formed on the photosensitive drum 1Y. The development unit 4Y has a Y-color development roller (not illustrated). The development unit 4Y incorporates a Y-color toner agent and carrier.

The Y-color development roller has magnets arranged inside. The two-component developer obtained by stirring the carrier and Y-color toner agent in the development unit 4Y is rotated and conveyed to the position opposite to the photosensitive drum 1Y, whereby the electrostatic latent image is developed by the Y-color toner agent. The Y-color toner image formed on this photosensitive drum 1Y is transferred onto the intermediate transfer belt 6 (primary transfer) through the operation of primary transfer roller 7Y. A cleaning section 8Y is mounted on the lower left side of the photosensitive drum 1Y to remove the toner agent remaining on the photosensitive drum 1Y in the previous write operation.

In this example, an image forming unit 10M is arranged below the image forming unit 10Y. The image forming unit 10M includes a photosensitive drum 1M, charging device 2M, LPH unit 5M, development unit 4M and cleaning section 8M for image formation, and forms a magenta (M) image. An image forming unit 10C is mounted below the image forming unit 10M. The image forming unit 10C includes a photosensitive drum 1C, charging device 2C, LPH unit 5C, development unit 4C and cleaning section 8C for image formation, and forms a cyan (C) image.

An image forming unit 10K is installed below the image forming unit 10C. The image forming unit 10K includes a photosensitive drum 1K, charging device 2K, LPH unit 5K, development unit 4K and cleaning section 8K for image formation, and forms a black (BK) image. OPC (Organic Photo Conductor) drums are used as the photosensitive drums 1Y, 1M, 1C and 1K.

To avoid duplication, the function of each of the image forming units 10M through 10K will not be described, because the description of the image forming unit 10Y is applicable to the image forming units 10M through 10K by replacing Y with M, C or K for the parts assigned with the same symbols as those of the image forming unit 10Y. The primary transfer bias voltage of a polarity (positive in this example) reverse to that of the toner agent to be used is applied to the primary transfer rollers 7Y, 7M, 7C and 7K.

The intermediate transfer belt 6 constitutes an example of the image carrying member. The toner images having been transferred by the primary transfer rollers 7Y, 7M, 7C and 7K are superimposed to form a color toner image (colored image). The colored image formed on the intermediate transfer belt 6 is fed toward the secondary transfer roller 7A by the clockwise rotation of the intermediate transfer belt 6. The secondary transfer roller 7A is located below the intermediate transfer belt 6. The color toner image formed on the intermediate transfer belt 6 is collectively transferred onto paper P (secondary transfer). From the secondary transfer roller 7A removed is the toner agent remaining on the secondary transfer roller 7A in the previous transfer process.

In this example, a cleaning section 8A is installed on the upper left of the intermediate transfer belt 6. It removes the toner agent remaining on the intermediate transfer belt 6 subsequent to transfer. The cleaning section 8A has a discharger (not illustrated) to remove charges from the intermediate transfer belt 6, and a pad to remove the toner remaining on the intermediate transfer belt 6. The belt surface is cleaned by this cleaning section 8A, and the intermediate transfer belt 6 subsequent to removal of charges by the discharger initiates the next image forming cycle. This arrangement allows a colored image to be formed on paper P.

The color printer 100 includes a sheet supply section 20 and fixing apparatus 17 in addition to the image forming section 80. A sheet supply section 20 constituting an example of the sheet feed selection device is mounted below the aforementioned image forming unit 10K. The sheet supply section 20 in this example is connected with a plurality of sheet supply trays Rn, which accommodate paper P in conformity to type of sheets. The sheet supply section 20 selects one sheet supply tray Rn from among a plurality of sheet supply trays Rn in conformity to the type of sheets, and feeds proper paper P to the sheet conveyance path.

The sheet conveyance path leading from the sheet supply section 20 to the portion below the image forming unit 10K is provided with conveyance rollers 22A and 22C, loop roller 22B, and registration roller 23. For example, the paper P fed from the sheet supply section 20 is held just before the secondary transfer roller 7A by the registration roller 23 and is fed out to the secondary transfer roller 7A in exact timing with the image. The secondary transfer roller 7A ensures that the colored image carried by the intermediate transfer belt 6 is transferred onto the predetermined paper P whose feed is controlled by a registration roller 23.

A fixing apparatus 17 is provided on the downstream side of the aforementioned secondary transfer roller 7A, and the paper P with a colored image transferred thereon is subjected to the process of fixing. The fixing apparatus 17 includes a fixing roller (not illustrated), pressure roller (not illustrated), heating (IH) heater (not illustrated) and the fixing cleaning section 17A. In the process of fixing, the paper P is passed through the fixing roller and pressure roller heated by a heater, whereby the paper P is heated and pressed. The paper P having been fixed is sandwiched by the paper ejection roller 24, and is ejected onto the dejection tray (not illustrated) outside the apparatus. The fixing cleaning section 17A removes the toner agent remaining on the fixing roller in the previous process of fixing.

FIG. 2 is a perspective view representing a configuration example of an image forming section 80. The image forming section 80 of FIG. 2 includes photosensitive drums 1Y, 1M, 1C and 1K, intermediate transfer belt 6, LPH units 5Y, 5M, 5C and 5K for colors, and rotation transmission mechanism 40.

The Y-color LPH unit 5Y has the length equal to the total width of the photosensitive drum 1Y, and ensures that the Y-colored image data Dy for each line or for several lines is collectively written in the main scanning direction in response to the Y-color index signal (hereinafter abbreviated as "Y-IDX signal")

The main scanning direction can be defined as the direction parallel to the rotary axis of the photosensitive drum 1Y. The photosensitive drum 1Y rotates in the sub-scanning direction. The aforementioned intermediate transfer belt 6 is moved in the sub-scanning direction at a constant linear velocity. The sub-scanning direction is the direction perpendicular to the rotary axis of the photosensitive drum 1Y. The photosensitive drum 1Y rotates in the sub-scanning direction and collective exposure is executed in the main scanning direction for each line by the LPH unit 5Y, whereby a Y-color electrostatic latent image is formed on the photosensitive drum 1Y.

The LPH units 5M, 5C and 5K for other colors also have the aforementioned lengths. Based on the M-IDX signal, C-IDX signal and, K-IDX signal for colors, the M-colored image data Dm, C-colored image data Dc and BK-colored image data Dk are collectively written in the similar manner. The Y-IDX signal, M-IDX signal, C-IDX signal and K-IDX signal for colors are supplied from the timing generation section 54 of FIG. 7. Further, these index signals are applied for each block formed by dividing the circumference of the photosensitive drum into, for example, 81 parts. To be more specific, the index signal includes the cycle obtained by dividing the rotational cycle of the photosensitive drum into approximately 81 parts. The LED heads each having a few thousand pixels through tens of thousands of pixels for each line are used as the LPH units 5Y, 5C, 5M and 5K, although it may vary according to the maximum width of the paper handled by the printer 100.

The rotation transmission mechanism 40 includes large-diameter gears 11Y, 11M, 11C and 11K, idle gears 12a and 12b, motor 30a and encoder 41. In this example, three photosensitive drums 1Y, 1M and 1C for Y, M and C colors are driven by a common motor 30a through a rotation transmission mechanism 40.

The large-diameter gears 11Y, 11M, 11C and 11K have diameters greater than those of the photosensitive drums 1Y, 1M, 1C and 1K for colors, and are mounted in the arrangement associated with these photosensitive drums 1Y, 1M, 1C and 1K. For example, the large-diameter gear 11Y is mounted on the photosensitive drum 1Y. Other large-diameter gears 11M, 11C and 11K are mounted in the similar manner.

The large-diameter gears 11Y and 11M are meshed with the idle gear 12a, and the large-diameter gears 11M and 11C are meshed with the idle gear 12b. The gear ratio between the idle gear 12a and large-diameter gears 11Y and 11M, and that between the idle gear 12b and large-diameter gears 11M and 11C are 1 to $\alpha$.

In this example, the idle gear 12b is meshed with a motor 30a through a motor gear 13c. The motor 30a has a motor shaft 13a, and a motor gear 13c is mounted on this motor shaft 13a. The gear ratio of the motor gear 13c and idle gear 12a is 1 to $\beta$.

In the rotation transmission mechanism 40, when the motor 30a rotates in the counterclockwise direction, the idle gear 12b rotates in the clockwise direction according to the gear ratio of 1 to $\beta$. The rotation of this idle gear 12b causes the large-diameter gear 11M and large-diameter gear 11C to rotate in the counterclockwise direction at the gear ratio 1 to $\alpha$. The rotation of the large-diameter gear 11M causes the photosensitive drum 1M to rotate in the counterclockwise direction. Similarly, the rotation of the large-diameter gear 11C causes the photosensitive drum 1C to rotate in the counterclockwise direction.

Further, the rotation of the large-diameter gear 11M in the counterclockwise direction causes the idle gear 12a to rotate in the clockwise direction. The clockwise rotation of the idle gear 12a is accompanied by the rotation of the large-diameter gear 11Y in the counterclockwise direction. The rotation of the large-diameter gear 11Y allows the photosensitive drum 1Y to rotate in the counterclockwise direction. This arrangement allows three photosensitive drums 1Y, 1M and 1C for Y, M and C colors to be driven by one common motor 30a through the rotation transmission mechanism 40.

The photosensitive drum 1K for BK color allows the large-diameter gear 11K to be directly driven by the motor 30b in conformity to the monochromatic high-speed mode, without the intervention of an idle gear. The motor 30b has a motor shaft 13b, and a motor gear 13d is mounted on the motor shaft 13b. The gear ratio between the motor gear 13d and large-diameter gear 11K is 1 to $\gamma$.

In this example, the encoder 41 having a measurement function is mounted on the shaft of the large-diameter gear 11M for M color. The angular (rotational) velocity of the photosensitive drum 1M for M color is detected and the angular velocity signal S41 is outputted. The angular velocity signal S41 having been outputted is inputted into the velocity detecting section 58 of FIG. 7. The velocity detecting section 58 constitutes the function of a measuring device together with the encoder 41, and measures the velocity fluctuation distribution for one round cycle of the drum.

Thus, the image forming section 80 is structured in such a way that three photosensitive drums 1Y, 1M and 1C for Y, M and C colors are driven by one motor 30a, and the photosensitive drum for BK color is directly driven by an independent motor 30b.

Figure 3:
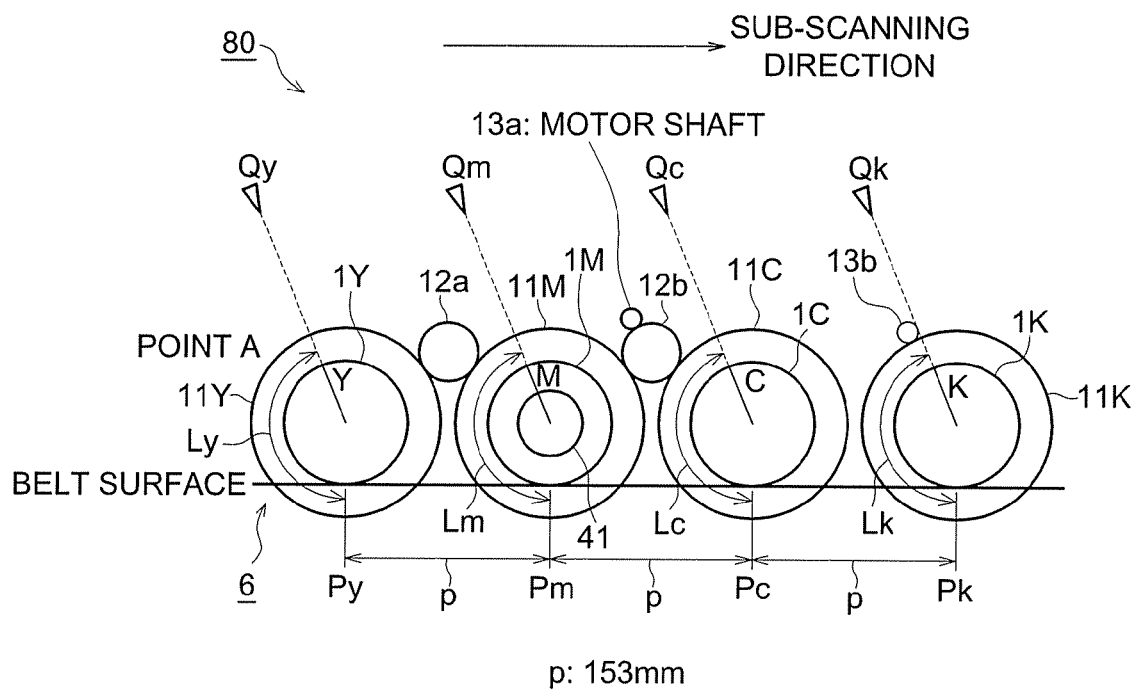
FIG. 3 is a diagram showing an example of photosensitive drum arrangement and setting example of its pitch arrangement.

FIG. 3 is a diagram showing arrangement examples of photosensitive drums 1Y, 1M, 1C and 1K and setting example of arrangement pitch p in an image forming section 80. In the image forming section 80 of FIG. 3, photosensitive drums 1Y, 1M, 1C and 1K are arranged on the intermediate transfer belt 6 sequentially in the sub-scanning direction. One motor 30a is installed to drive the photosensitive drums 1Y, 1M and 1C for Y, M and C colors. A dedicated motor 30b is installed to drive the photosensitive drum 1K for BK color.

The arrangement pitch p shown in FIG. 3 indicates the drum interval in the photosensitive drums 1Y, 1M, 1C and 1K for colors. In this example, the portions wherein the belt surface of the intermediate transfer belt 6 coming in contact with the photosensitive drums 1Y, 1M, 1C and 1K for colors contacts each of the photosensitive drums 1Y, 1M, 1C and 1K are assumed as transfer positions Py, Pm, Pc and Pk (primary transfer positions), respectively. The arrangement pitch p in the sense in which it is used here refers to the distance between transfer positions Py-Pm, the distance between transfer positions Pm-Pc, and the distance between transfer positions Pc-Pk.

In this example, when the peripheral length of the photosensitive drums 1Y, 1M, 1C and 1K for colors is assumed as $60\pi = 188.5$ mm, the arrangement pitch p is of the order of 153 mm, although it depends on the maximum width of the paper handled by the printer 100. In the drawing, the point Qy refers to the position wherein the LHP unit 5Y is arranged. It indicates the exposure position in the laser beam. Similarly, the point Qm is the position wherein the LHP unit 5M is located, and indicates the exposure position thereof. The point Qc is the position wherein the LHP unit 5C is located and indicates the exposure position thereof. The point Qk is the position wherein the LHP unit 5K is arranged and indicates the exposure position.

The drum peripheral distance Ly of FIG. 3 indicates the distance between the exposure position Qy in the photosensitive drum 1Y and the transfer position Py thereof. Similarly, the drum peripheral distance Lm indicates the distance between the exposure position Qm in the photosensitive drum 1M and the transfer position Pm thereof. The drum peripheral distance Lc is the distance between the exposure position Qc in the photosensitive drum 1C and the transfer position Pc thereof. The drum peripheral distance Lk is the distance between the exposure position Qk in the photosensitive drum 1K and the transfer position Pk thereof. Any one of drum peripheral distances Ly, Lm, Lc and Lk is used as a reference for obtaining the difference in the rotary angle between the exposure position and the transfer position thereof.

In this example, the relationship of an integral multiple is present between the peripheral length of the idle gear 12a and others, and the distance Ly between the exposure position Qy and transfer position Py in the Y-color photosensitive drum 1Y. The photosensitive drums 1M, 1C and 1K for other colors M, C, and BK are also assigned with the same relationship.

Figure 4:
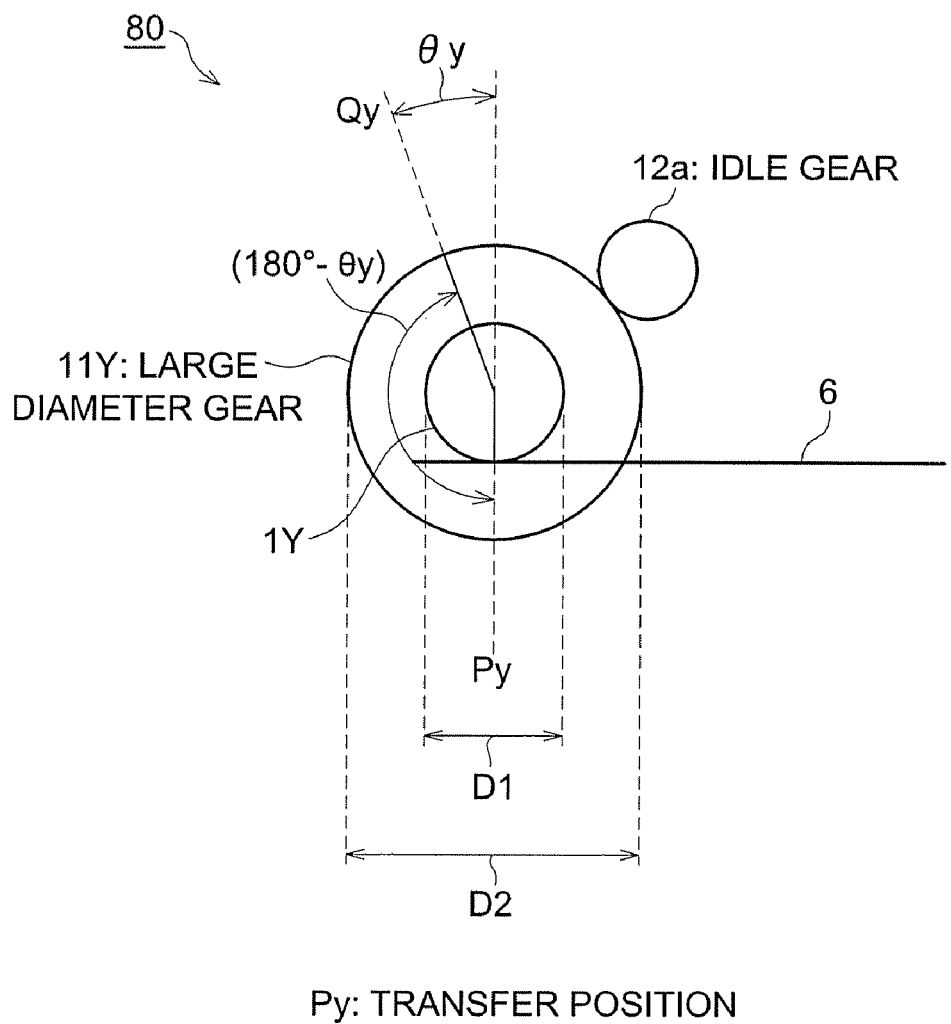
FIG. 4 is a diagram showing a setting example of the exposure position Qy of a photosensitive drum 1Y with respect to transfer position Py.

FIG. 4 is a conceptual diagram showing a setting example of the exposure position Qy of the photosensitive drum 1Y with respect to transfer position Py on the intermediate transfer belt 6. In this example, the exposure position Qy of the photosensitive drum 1Y with respect to transfer position Py on the intermediate transfer belt 6 in FIG. 4 is set to angle θy. In this case, when the angle formed by the plumb line of the transfer position Py and the line segment connecting between the rotary center axes of the exposure position Qy and photosensitive drum 1Y is assumed as θy, the θy is set to θy=22.2°, for example. For the photosensitive drums 1M, 1C and 1K of other colors, θm, θc, θk are defined in the same manner, and the setting is given as θy=θm=θc=θk.

The diameter D1 of the Y-color photosensitive drum 1Y shown in FIG. 4 is 60 mm, for example. The photosensitive drums 1M, 1C and 1K for other colors M, C, and BK also have the diameter D1. The diameter D2 of the large-diameter gear 11Y of the Y-color photosensitive drum 1Y is 114.93 mm, for example. The large-diameter gears 11M, 11C and 11K of the photosensitive drums 1M, 1C and 1K of other colors M, C, and BK also have the diameter D2.

The impact of the delay in the rotation of the idle gears 12a and 12b is set to an integral multiple of the distance Lm between the transfer position Qm and exposure position Pm. Thus, in the transfer position Qy of the intermediate transfer belt 6 on the belt surface with respect to the transfer position Qy of Y-color and the transfer position Qc on the belt surface with respect to the transfer position Qc of C-color, the reproducibility of superimposition of the Y, M and C colors can be ensured from the distances Ly, Lm and Lc set to the integral multiple.

According to this relationship, the rotary angle error of the photosensitive drum 1M for M color sharing a common drive system is sampled (hereinafter referred to as "drum sampling"). Based on this drum sampling, a correction data table of the photosensitive drums 1Y, 1C and 1K for other Y, C, and BK colors is created, and the index signal is corrected, whereby the fluctuation component thereof can be ignored.

In this example, drum sampling is executed for each type of sheets in advance and a plurality of correction data tables associated for each type of sheets are created. These tables are stored in the memory 72 of FIG. 7. In the case of drum sampling, sampling is performed while an image is actually formed.

Figure 7:
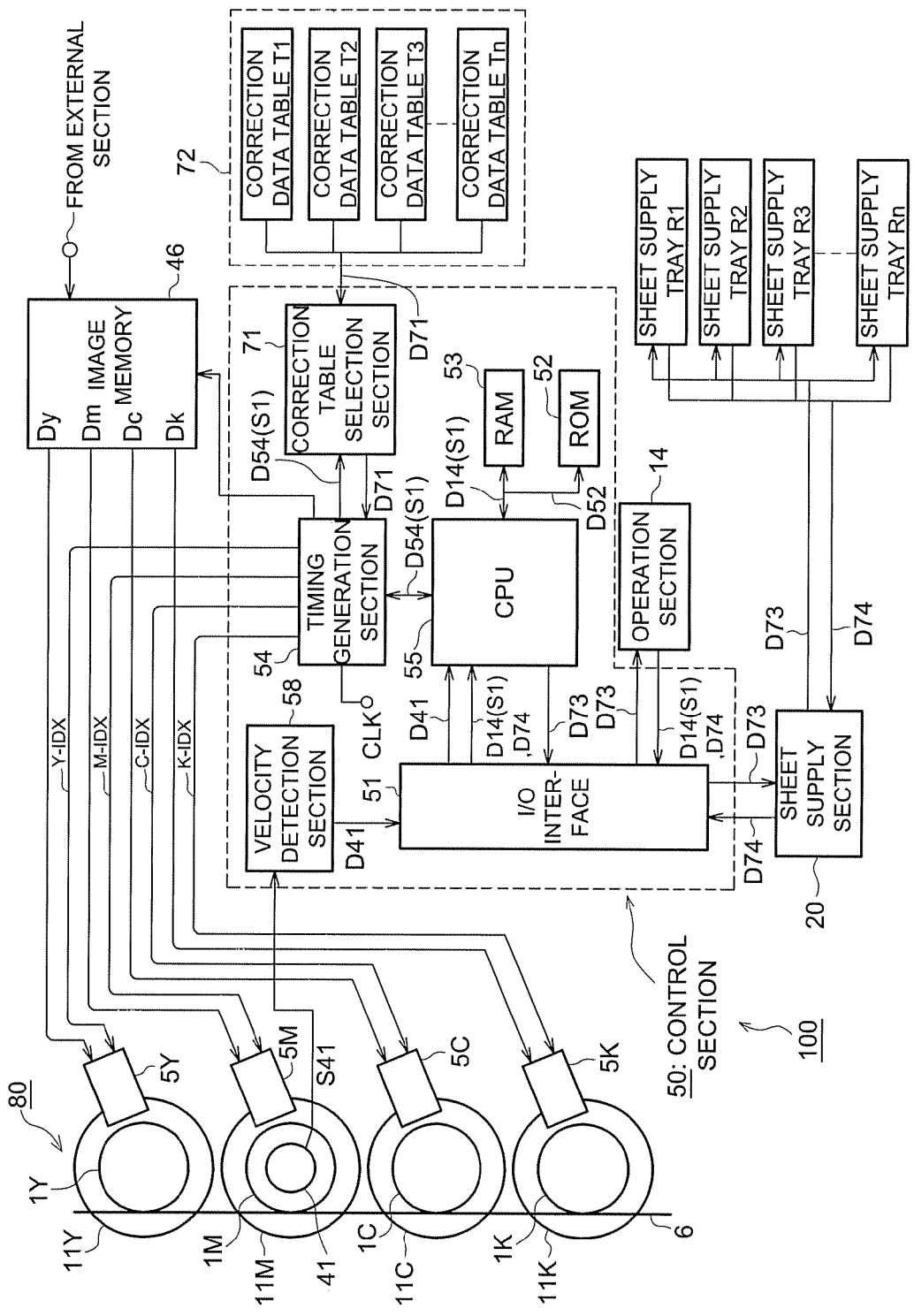
FIG. 7 is a block diagram showing configuration example of the control system for color printer 100.

In the first place, a predetermined type of paper P is fed, and image formation processing is applied to paper P. During this process, the rotational velocity of the photosensitive drum is detected by the encoder 41. The velocity fluctuation distribution for one round cycle of drum having been detected is inputted into the velocity detecting section 58 (FIG. 7).

In response to the velocity fluctuation distribution having been inputted, the velocity detecting section 58 or CPU 55 (FIG. 7) measures the correction value to correct the reference index signal. The measured correction value is recorded onto the correction data table in a predetermined format, and is stored into the memory 72 after having been associated for each type of sheets.

To be more specific, the correction data table stores the correction value for associating the velocity fluctuation distribution for one round cycle of drum having been measured by the encoder 41, this correction value being the one for correcting the cycle of the reference index signal. Further, the correction data table also reflects the load fluctuation caused by the paper P plunging onto the intermediate transfer belt 6 from the sheet conveyance path. The correction data table is composed of data files, for example. The following describes the method of creating the correction data table.

Figure 5:
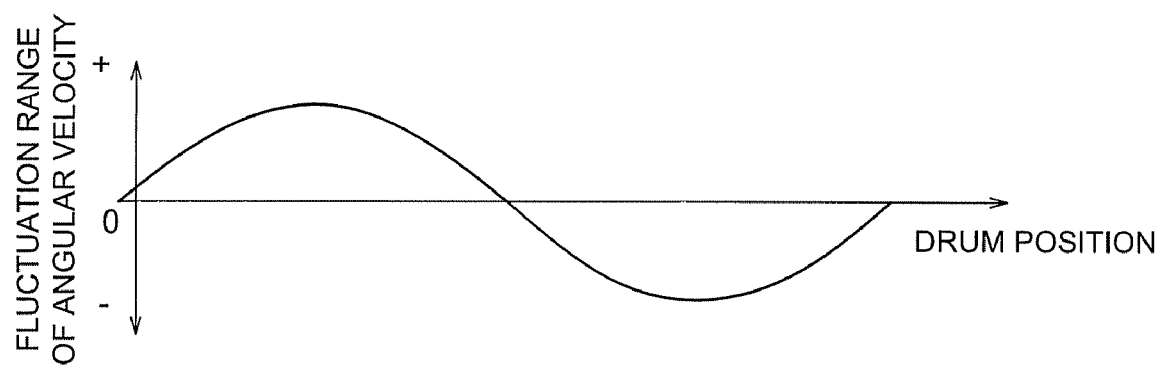
FIG. 5 is a diagram showing the velocity fluctuation example of the photosensitive drum 1Y.

FIG. 5 is a diagram showing the velocity fluctuation example of a photosensitive drum 1Y. This example shows the velocity fluctuation example of the photosensitive drum 1Y when the three photosensitive drums 1Y, 1M and 1C for Y, M and C colors are driven by a common motor 30a through the rotation transmission mechanism 40. Here the photosensitive drum 1Y is provided with an encoder for sampling, whereby measurement is performed. It is also possible to arrange such a configuration that velocity fluctuation rate of the photosensitive drum 1Y is estimated from the encoder 41 of the photosensitive drum 1M.

In FIG. 5, the horizontal axis indicates the drum position, and represents the sampling point along the peripheral length of the drum. The vertical axis indicates the range of fluctuation, and represents the low-frequency amplitude obtained by removing the high-frequency noise and DC component from the drum fluctuation component.

In this example, 24 sampling points are set along the peripheral length of the photosensitive drum 1Y, and the range of fluctuation of the drum is obtained at the sampling point of 15-degree resolution. Based on this result, operation is performed to obtain the amount of correction when one peripheral length of the photosensitive drum 1Y is divided into 81 parts. The same procedure applies also to the photosensitive drums 1M, 1C and 1K for other colors, and LPH units 5M, 5C and 5K. In this example, furthermore, the angular velocity is sampled along three peripheral lengths of the drum at the time of drum sampling, and the average of the sampled values thereof is found (three-round averaging method), thereby eliminating the trend (inclination fluctuation) with respect to drum reproducibility.

FIGS. 6A through D are the diagrams representing an example of correcting the angle error in the photosensitive drums for colors. In this example, the correction values in the correction data table are represented in terms of time difference between a certain angle of each of the photosensitive drums 1Y, 1M, 1C and 1K and other normal rotary angles. These correction values can be derived from the result of drum sampling for each type of sheets.

The sampling numbers of FIG. 6A indicate No. 1, No. 2, No. 3, No. 4, . . . No. 81 (not illustrated). In FIG. 6B, the horizontal axis indicates the time t. The broken line in the diagram indicates the time information obtained by dividing "661 ms" at 81 sampling points wherein the "661 ms" is gained by converting the drum 1 peripheral length (60π=188.5 mm) into time. With respect to the sampling No. 1 of FIG. 6A, the reference time is 8.16 ms and the correction value thereof is +A. Thus, in the rotary angle error table, the exposure timing in the sampling No. 1 is set to the reference time (8.16 ms)+correction value A. Similarly, with respect to the sampling No. 2, the reference time is 16.32 ms, and the correction value thereof is +B. Thus, with respect to the sampling No. 2, the exposure timing is set to the reference time (16.32 ms)+correction value B.

Further, with respect to the sampling No. 3, the reference time is 24.48 ms, and the correction value thereof is –C. Thus, the exposure timing in the sampling No. 3 is set to the reference time (24.48 ms)–correction value C. Similarly, with respect to the sampling No. 4, the reference time is 32.64 ms, and the correction value thereof is –D. Thus, the exposure timing in the sampling No. 4 is set to the reference time (32.64 ms)–correction value D.

In this example, the rise of the Y-IDX signal of FIG. 6C is corrected according to the time information corresponding to sampling Nos. 1 through 81 of FIG. 6B. To be more specific, simultaneously with the rise of the corrected Y-IDX signal in FIG. 6C, the image data Dy of FIG. 6D is written onto the photosensitive drum 1Y from the Y-color LPH unit 5Y shown in FIG. 2. The same procedure is applied to the photosensitive drums 1M, 1C and 1K for other colors and LPH units 5M, 5C and 5K.

The record the correction value (correction value A, correction value B, etc.) obtained in above-mentioned manner is recorded and a correction data table can be created. The following describes the structure of the control system of the color printer 100.

FIG. 7 is a block diagram showing configuration example of the control system for color printer 100. The color printer 100 of FIG. 7 modifies the cycle of the index signal of the LPH units 5Y, 5M, 5C and 5K in such a way as to correct the angular velocity fluctuation of the photosensitive drums 1Y, 1M, 1C and 1K. The color printer 100 adjusts the intervals of images on the drum surface, and reduces the pitch irregularity and registration positional misalignment (low frequency) caused by eccentricity.

In this example, with respect to the photosensitive drums 1Y, 1M, 1C and 1K for colors, the control section 50 corrects the transfer time lag to the intermediate transfer belt 6 independently for each photosensitive drum. In this case, one correction data table Tn corresponding to the type of paper P is selected and read out of a plurality of correction data tables, whereby the index signal conforming to the correction data table Tn is created.

The color printer 100 includes an operation section 14 for controlling the image forming section 80, image memory 46, memory 72, control section 50, sheet supply section 20 for feeding paper to the image forming section 80, and sheet supply tray Rn. The control section 50 includes an I/O interface 51, ROM (Read Only Memory) 52, RAM (Random Access Memory) 53 for work, timing generation section 54, CPU (Central Processing Unit) 55, and correction table selection section 71.

The CPU 55 is connected with the ROM 52, and a system startup program data D52 for controlling the entire printer is stored into the ROM 52. The program data D52 and various forms of control commands are collectively stored into the RAM 53 on the temporary basis. When the power of the CPU 55 has been turned on, the system program data D52 is read into the RAM 53 from the ROM 52 and the system is started, whereby the entire printer is placed under control.

The CPU 55 is connected with an operation section 14 through the I/O interface 51. The operation section 14 receives various forms of control commands to be inputted through operation of the operation section and input data D14 on the type of sheets information S1 and others. In this case, the type of sheets information S1 includes the description of the type of paper P (including the information on material and size) involved in a series of image forming processes (print), and the number of sheets.

The input data D14 is inputted through an operation panel and medium connection unit (not illustrated). Further, the input data D14 is supplied to the printer 100 from the external apparatus such as a personal computer through the medium connection unit in some cases. The input data D14 inputted from the operation section 14 is inputted into the CPU 55 via the I/O interface 51. The CPU 55 constitutes an example of the control device and generates the timing control information D54 conforming to the description of the input data D14.

The CPU 55 is connected with the timing generation section 54 as a signal generating means, and the timing control information D54 is inputted therein. The timing generation section 54 is connected with the correction table selection section 71. In response to the type-of-sheets information S1 contained in the timing control information D54, the correction table selection section 71 refers to the correction data table of the memory 72 for each type of sheets, and selects and reads one correction data table—e.g., correction data table T1—out of a plurality of correction data table.

According to the selected correction data table T1, the CPU 55 corrects the reference signal, and control the image forming section 80 according to the corrected reference signal so that an image is formed on the photosensitive drums 1Y, 1M, 1C and 1K.

The correction data table is stored in the memory 72 in this case. In this example, the correction value stored in the correction data table is represented in terms of the time lag between a certain rotary angle of each of the photosensitive drums 1Y, 1M, 1C and 1K, and other normal rotary angles.

Based on the clock signal (hereinafter referred to as "CLK signal"), the timing control information D54 and correction data table T1, for example, the timing generation section 54 corrects the reference cycle of the reference index signal for each type of sheets and outputs the index signal, Y-IDX signal, M-IDX signal, C-IDX signal and K-IDX signal of the corrected cycle. The CLK signal is supplied by a clock generator (not illustrated). The index signal for each type of sheets outputted from the timing generation section 54 is supplied to the image forming section 80.

The Y-IDX signal is an index signal for authorizing the collective exposure for each line based on the Y-colored image data Dy. The M-IDX signal is an index signal for authorizing the collective exposure for each line based on the M-colored image data Dm. The C-IDX signal is an index signal for authorizing the collective exposure for each line based on the C-colored image data Dc. K-IDX signal is an index signal for authorizing the collective exposure for each line based on the BK-colored image data Dk. These index signals (reference signals) provide write timing to correct the angular velocity fluctuation of the photosensitive drum resulting from the size and material of paper P on which an image is formed.

The timing generation section 54 is connected with four LPH units 5Y, 5M, 5C and 5K. The LPH units 5Y, 5M, 5C and 5K are connected with the image memory 46. According to the Y-IDX signal outputted from the timing generation section 54, the LPH unit 5Y operates in such a way as to ensure that the Y-colored image data Dy read out of the image memory 46 for each line or collectively for several lines is written in the main scanning direction of the photosensitive drum 1Y.

Similarly, according to the M-IDX signal, the LPH unit 5M operates in such a way as to ensure that the M-colored image data Dm for each line or collectively for several lines is written in the main scanning direction of the photosensitive drum 1M. According to the C-IDX signal, the LPH unit 5C operates in such a way as to ensure that the C-colored image data Dc for each line or collectively for several lines is written in the main scanning direction of the photosensitive drum 1C. According to the K-IDX signal, the LPH unit 5K operates in such a way as to ensure that the BK-colored image data Dk read out of the image memory 46 for each line or collectively for several lines is written in the main scanning direction of the photosensitive drum 1K.

The timing generation section 54 is connected with the image memory 46 in such a way that the digital image data Dy, Dm, Dc and Dk having been received from the outside is stored, for example. A nonvolatile memory such as a hard disk (HDD) or EEPROM is used as the image memory 46. The aforementioned correction data table can be assigned and stored in the memory area of the image memory 46.

In the meantime, the operation section 14 is connected with a sheet supply section 20 of the conveyance system so as to select a sheet supply tray Rn for each type of sheets. For example, when image forming process is executed according to the type-of-sheets information S1 inputted from the operation section 14, the CPU 55 outputs the sheet feed data D173 conforming to the type-of-sheets information S1, and controls the sheet supply section 20 to ensure that the paper P with an image formed thereon is supplied from the sheet supply tray Rn to the image forming section 80.

Further, the sheet supply tray Rn is provided with a paper detecting sensor (not illustrated), and the storage data D174 denoting the paper selection information is outputted to the CPU 55 through the I/O interface 51.

In this case, for example, when there is only one type of sheets on which an image is formed, the correction data table can be automatically selected from the storage data D174. To be more specific, image forming process can be executed according to the storage data D174, without the aforementioned type-of-sheets information S1 being inputted.

In this case, the CPU 55 provides control in such a way that paper P is supplied, for example, to the image forming section 80 from the sheet supply tray R1 according to the storage data D174, the correction data table T1 corresponding to paper P is supplied to the timing generation section 54 from the memory 72, and the corrected index signal corresponding to the paper P outputted from the timing generation section 54 is supplied to the image forming section 80.

Figure 8:
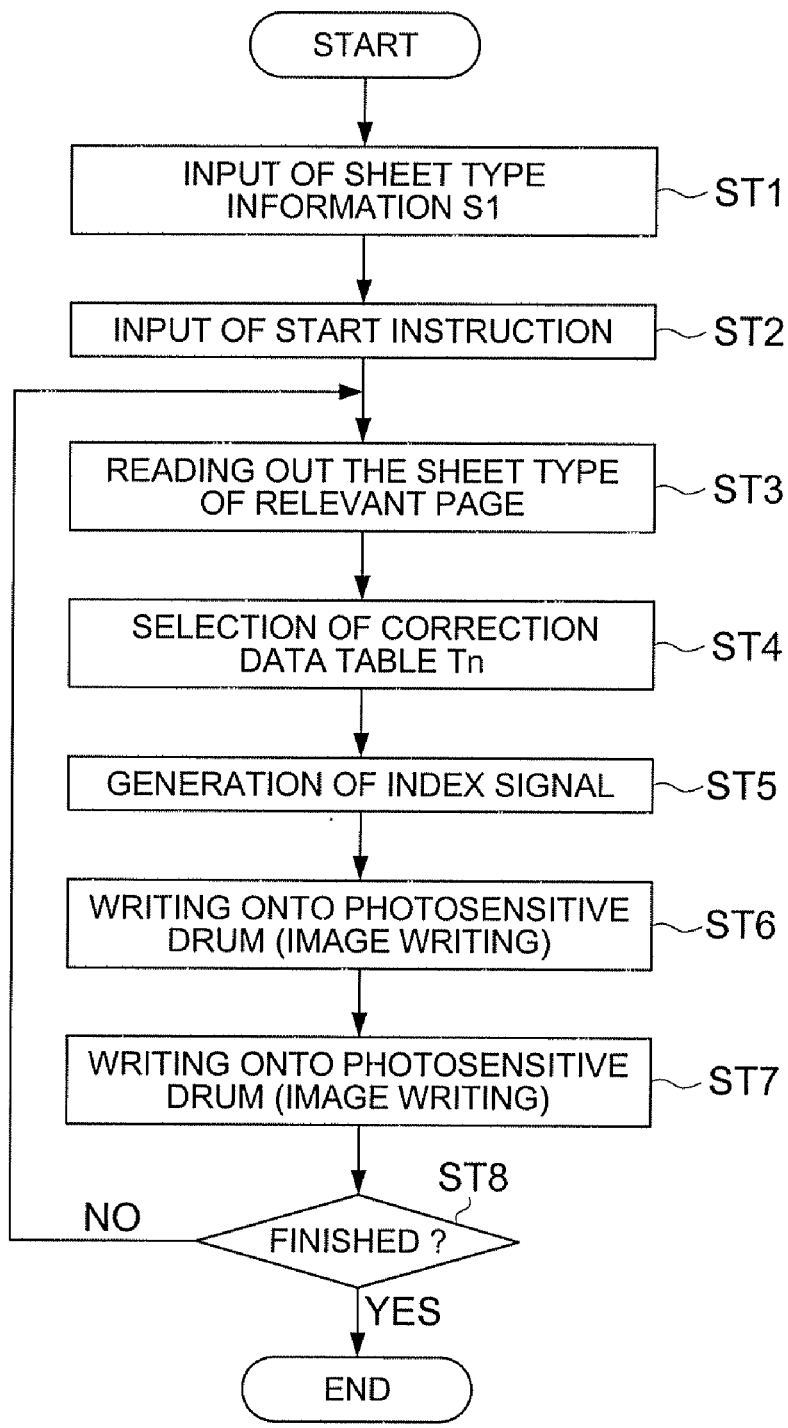
FIG. 8 is a flow chart representing the example of image forming process for color printer 100.

The CPU 55 wherein the storage data D174 is inputted can also provide control in such a way that, if paper is not stored in the sheet supply tray Rn for the type of sheets to be printed, the operation section 14 rejects acceptance of the start command for initiating the process of printing. Further, the printing operation can be suspended if paper P runs out in the process of printing. In the above-mentioned manner, the control system of the color printer 100 is configured. The following describes the image forming method of the present invention:

FIG. 8 is a flow chart representing the example of image forming process for color printer 100. In this example, the type-of-sheets information S1 on a colored booklet made up of a plurality of the types of sheets is inputted from the operation panel, and the correction data table conforming to the type-of-sheets information S1 is read out. At the same time, while the paper P conforming to the type of sheets is fed out of the sheet supply section 20, continuous printing is performed. This procedure is taken up as an example for the following description. Further, the colored image information is supplied to this printer 100 from an external apparatus such as a personal computer and is transferred to the image forming section 80.

Under these processing conditions, the operation section 14 accepts the input of the type-of-sheets information S1 in Step ST1 in the flow chart of FIG. 8. The type-of-sheets information S1 is inputted through the operation panel or medium connection unit, for example. Alternatively, the type-of-sheets information S1 is inputted from the personal computer connected to the medium connection unit. In this case, the type-of-sheets information S1 as well as image data Dy, Dm, Dc and Dk are stored in the image memory 46.

Upon receipt of the type-of-sheets information S1, in Step ST2, the operation section 14 receives the input of the start command for initiating the process of printing. In this case, the START button, for example, can be lighted to notify that the start command can be inputted. Further, in this case, the operation section 14 and CPU 55 refer to the storage data D174 of the sheet supply tray Rn corresponding to the type of sheets included in the type-of-sheets information S1, whereby verification is made to see if the required paper P is stored or not. It is also possible to arrange such a configuration that, if the paper P is not stored, the absence of paper P is notified and the start command is rejected.

After the start command has been inputted, image forming process starts. In the first place, in Step ST3, the CPU 55 reads the type of sheets on the first page of the booklet from the type-of-sheets information S1. The CPU 55 reads out the information from the type-of-sheets information S1, and supplies the timing control information D54 containing such information to the timing generation section 54 and correction table selection section 71.

In response to the timing control information D54 having been inputted, the correction table selection section 71 refers to the correction data table in Step ST4, and selects and reads the correction data table Tn conforming to the type of sheets on the first page. For example, the correction data table T1 is read.

In the following Step ST5, the timing generation section 54 corrects the reference index signal according to the correction data table T1 having been read. In this case, the timing generation section 54 generates the reference index signal in response to the clock signal (hereinafter referred to as "CLK signal"), and corrects the generated reference index signal according to the correction data table T1, whereby the Y-IDX signal, M-IDX signal, C-IDX signal and K-IDX signal are created, and are outputted to four LPH units 5Y, 5M, 5C and 5K.

In Step ST6, Y-IDX signal, M-IDX signal, C-IDX signal and, K-IDX signal are inputted into four LPH units 5Y, 5M, 5C and 5K. Based on the corrected index signal, images associated with image data Dy, Dm, Dc and Dk from the image memory 46 are formed on the respective photosensitive drums.

The image data formed on the photosensitive drum is transferred onto the intermediate transfer belt 6, and is transferred on the paper P by the secondary transfer roller 7A in Step ST7. The paper P in this case is supplied from the sheet supply tray Rn corresponding to the type of sheets on the first page, for example, from the sheet supply tray R1 through the sheet supply section 20. The sheet supply section 20 in this case selects the sheet supply tray R1 in conformity to the type-of-sheets information S1 inputted in Step ST1.

In Step ST8, a step is taken to determine whether or not the CPU 55 has terminated the image forming process for above-mentioned booklet. in this case, the CPU 55 refers to the type-of-sheets information S1. If there is a type of sheets to be printed, the system goes back to Step ST3, and reads out the type of sheets on the next page. If there is no type of sheets to be printed, the image forming process terminates. Thus, the image formation of the color printer 100 is performed in the above-mentioned procedure.

As described above, in the color printer 100 using the image forming method according to the embodiment of the present invention is provided with the CPU 55 to control the timing generation section 54 and image forming section 80. With respect to the velocity fluctuation distribution for one round cycle of drum, the CPU 55 refers, for each e type of sheets, to a plurality of correction data tables associated for each type of sheets, and controls the timing generation section 54 so as to correct the reference cycle of the reference index signal for each type of sheets. At the same time, the CPU 55 also sets the index signal of the corrected cycle on the image forming section 80 for each type of sheets.

This arrangement allows an image to be formed on the photosensitive drum by the index signal of the cycle corresponding to the thickness and frictional force of the transfer member. This ensures a high-quality image to be formed on the various types of transfer sheets free from any image misalignment or line misregistration.

Further, the correction data table associated with the type of sheets can be easily read out even when the type of the paper P has been changed during the process of continuous printing. This allows high-quality continuous printing to be performed without having to prolong the printing time. Further, at the time of sampling, the fluctuation in rotational velocity resulting from the inrush of transfer sheets is also sampled. Therefore, the image misalignment due to inrush of the transfer sheets can be corrected.

In this example, the correction data table is stored in the memory 72. Without the present invention being restricted thereto, this table can be programmed to be stored into the image memory 46. Alternatively, it is also possible to arrange such a configuration that the table is stored in other medium and is inputted through the medium connection unit of the operation section 14 at the time of image formation. It goes without saying that this table can be directly inputted from a computer.

In the color printer 100 of this example described so far, colored images are primarily transferred onto the intermediate transfer belt 6, and are then transferred onto the transfer sheets on the secondary basis. Without the present invention being restricted thereto, the image forming apparatus and image forming method of the present invention can be applied to the color printer wherein images are directly transferred from the photosensitive drum to the transfer member. It is also applicable to the printer for a single color (e.g., black) having one photosensitive drum.

Second Embodiment

FIG. 1 is a conceptual diagram representing a configuration example of a color printer 200 as a second embodiment of the present invention.

The tandem type color printer 200 of FIG. 1 constitutes an example of the image forming apparatus, and the image write control signal of the reference cycle (hereinafter referred to as "reference index signal") is corrected for each block obtained by dividing the peripheral length of the image carrying member into "n" parts. Colored images are formed according to the write synchronizing signal and digital colored image information of the index cycle having been corrected. The image carrying member has a rotary support member and the surface thereof constitutes a photosensitive member. The color printer 200 includes at least one rotary support member.

The color printer 200 drives, for example, three image carrying members through the rotation transmission mechanism 40 and common motor 30a (drive source) (FIG. 2), whereby the colored images formed on respective image carrying member are superimposed on the intermediate transfer belt 6. Colored images are transferred onto predetermined paper P and are fixed thereon. The colored image information is supplied to this printer 100 from an external apparatus such as a personal computer and is then sent to the image forming section 80.

The image forming section 80 includes: an image forming unit 10Y including the photosensitive drum 1Y for yellow (Y) color that constitutes an example of the image carrying member; a photosensitive drum 1M for magenta (M) color; a photosensitive drum 1C for cyan (C) color; a photosensitive drum 1K for black (K) color; and an endless intermediate transfer belt 6. The image forming section 80 forms an image for each of the photosensitive drums 1Y, 1M, 1C and 1K, whereby the colored toner images having been formed by photosensitive drums 1Y, 1M, 1C and 1K are superimposed on the intermediate transfer belt 6, so that a colored image is formed.

In this example, the image forming unit 10Y includes a charging device 2Y, linear optical head (LED Array Print Head (hereinafter referred to as "LPH unit 5Y"), a development unit 4Y and a cleaning section 8Y for image forming member in addition to the photosensitive drum 1Y, whereby a yellow (Y) image is formed. The photosensitive drum 1Y constitutes an example of the image carrying member. For example, the photosensitive drum 1Y is rotatably mounted in close proximity to the upper right of the intermediate transfer belt 6, whereby the Y-color toner image is formed. In this example, the photosensitive drum 1Y is rotated in the counterclockwise direction by the rotation transmission mechanism 40 of FIG. 2. A charging device 2Y is provided obliquely to the lower right of the photosensitive drum 1Y so that the surface of the photosensitive drum 1Y is charged to a predetermined potential level.

Approximately on the right of the photosensitive drum 1Y, an LPH unit 5Y, opposed to the drum 1Y, is mounted in parallel in the main scanning direction. The LPH unit 5Y control of exposure timing for the pre-charged photosensitive drum 1Y, whereby the laser beam of predetermined intensity in conformity to the Y-color image data is collectively applied. The LPH unit having the linearly arranged LED heads (not illustrated) is used as the LPH unit 5Y. In the image write system, a scanning exposure system based on a polygon mirror (not illustrated) can be used instead of the LPH unit. A Y-color electrostatic latent image is formed on the photosensitive drum 1Y.

A development unit 4Y is installed over the LPH unit 5Y, and develops the Y-color electrostatic latent image formed on the photosensitive drum 1Y. The development unit 4Y has a Y-color development roller (not illustrated). The development unit 4Y incorporates a Y-color toner agent and carrier.

The Y-color development roller incorporates magnets, and operates in such a way that the two-component developer obtained by stirring carrier and Y-color toner agent inside the development unit 4Y is fed by rotation to the site opposed to the photosensitive drum 1Y, and the electrostatic latent image is developed by the Y-colored toner agent. The Y-colored toner image formed on this photosensitive drum 1Y operates the primary transfer roller 7Y and is transferred onto the intermediate transfer belt 6 (primary transfer). A cleaning section 8Y is mounted on the lower left of the photosensitive drum 1Y to remove the toner agent remaining on the photosensitive drum 1Y in the previous write operation (cleaning).

In this example, an image forming unit 10M is installed below the image forming unit 10Y. The image forming unit 10M includes a photosensitive drum 1M, charging device 2M, LPH unit 5M, development unit 4M and cleaning section 8M for image forming member, whereby a magenta (M) colored image is formed. An image forming unit 10C is mounted below the image forming unit 10M. The image forming unit 10C includes a photosensitive drum 1C, charging device 2C, LPH unit 5C, development unit 4C and cleaning section 8C for image forming member, whereby a cyan (C) colored image is formed.

An image forming unit 10K is installed below the image forming unit 10C. The image forming unit 10K includes a photosensitive drum 1K, charging device 2K, LPH unit 5K, development unit 4K and cleaning section 8K for image forming member, whereby a black (BK) colored image is formed. OPC (Organic Photo Conductor) drums are used as the photosensitive drums 1Y, 1M, 1C and 1K.

To avoid duplication, the function of each of the image forming units 10M through 10K will not be described, because the description of the image forming unit 10Y is applicable to the image forming units 10M through 10K by replacing Y with M, C or K for the parts assigned with the same symbols as those of the image forming unit 10Y. The primary transfer bias voltage of a polarity (positive in this example) reverse to that of the toner agent to be used is applied to the primary transfer rollers 7Y, 7M, 7C and 7K.

The intermediate transfer belt 6 constitutes an example of the image carrying member. The toner images having been transferred by the primary transfer rollers 7Y, 7M, 7C and 7K are superimposed to form a color toner image (colored image). The colored image formed on the intermediate transfer belt 6 is fed toward the secondary transfer roller 7A by the clockwise rotation of the intermediate transfer belt 6. The secondary transfer roller 7A is located below the intermediate transfer belt 6. The color toner image formed on the intermediate transfer belt 6 is collectively transferred onto paper P (secondary transfer). From the secondary transfer roller 7A removed is the toner agent remaining on the secondary transfer roller 7A in the previous transfer process.

In this example, a cleaning section 8A is installed on the upper left of the intermediate transfer belt 6. It removes the toner agent remaining on the intermediate transfer belt 6 subsequent to transfer. The cleaning section 8A has a discharger (not illustrated) to remove charges from the intermediate transfer belt 6, and a pad to remove the toner remaining on the intermediate transfer belt 6. The belt surface is cleaned by this cleaning section 8A, and the intermediate transfer belt 6 subsequent to removal of charges by the discharger initiates the next image forming cycle. This arrangement allows a colored image to be formed on paper P.

The color printer 100 includes a sheet supply section 20 and, fixing apparatus 17 in addition to the image forming section 80. A sheet supply section 20 is mounted below the aforementioned image forming unit 10K, and is composed of a plurality of sheet supply trays (not illustrated). The sheet conveyance path leading from the sheet supply section 20 to the portion below the image forming unit 10K is provided with conveyance rollers 22A and 22C, loop roller 22B, and registration roller 23. For example, the paper P fed from the sheet supply section 20 is held just before the secondary transfer roller 7A by the registration roller 23, and is fed out to the secondary transfer roller 7A in exact timing with the image formation. The secondary transfer roller 7A ensures that the colored image carried by the intermediate transfer belt 6 is transferred onto the predetermined paper P whose feed is controlled by a registration roller 23.

A fixing apparatus 17 is provided on the downstream side of the aforementioned secondary transfer roller 7A, and the paper P with a colored image transferred thereon is subjected to the process of fixing. The fixing apparatus 17 includes a fixing roller (not illustrated), pressure roller (not illustrated), heating (IH) heater (not illustrated) and the fixing cleaning section 17A. In the process of fixing, the paper P is passed through the fixing roller and pressure roller heated by a heater, whereby the paper P is heated and pressed. The paper P having been fixed is sandwiched by the paper ejection roller 24, and is ejected onto the dejection tray (not illustrated) outside the apparatus. The fixing cleaning section 17A removes the toner agent remaining on the fixing roller in the previous process of fixing.

FIG. 2 is a perspective view representing a configuration example of an image forming section 80. The image forming section 80 of FIG. 2 includes photosensitive drums 1Y, 1M, 1C and 1K, intermediate transfer belt 6, LPH units 5Y, 5C, 5C and 5K for colors, and rotation transmission mechanism 40.

The Y-color LPH unit 5Y has the length equal to the total width of the photosensitive drum 1Y, and ensures that the Y-colored image data Dy for each line or for several lines is collectively written in the main scanning direction in response to the Y-color index signal (hereinafter abbreviated as "Y-IDX signal". The Y-IDX signal is an image write synchronizing signal wherein the reference cycle T of the reference index signal has been corrected by a predetermined level of correction. The level of correction is the date for eliminating the adverse effect of the velocity fluctuation irregularity of one round cycle of the image carrying member (hereinafter referred to as "one round cycle of drum").

The main scanning direction can be defined as the direction parallel to the rotary axis of the photosensitive drum 1Y. The photosensitive drum 1Y rotates in the sub-scanning direction. The aforementioned intermediate transfer belt 6 is moved in the sub-scanning direction at a constant linear velocity. The sub-scanning direction is the direction perpendicular to the rotary axis of the photosensitive drum 1Y. The photosensitive drum 1Y rotates in the sub-scanning direction and collective exposure is executed in the main scanning direction for each line by the LPH unit 5Y, whereby a Y-color electrostatic latent image is formed on the photosensitive drum 1Y.

The LPH units 5M, 5C and 5K for other colors also have the aforementioned lengths. Based on the M-IDX signal, C-IDX signal and, K-IDX signal for colors, the M-colored image data Dm, C-colored image data Dc and BK colored image data Dk are collectively written in the similar manner. The Y-IDX signal, M-IDX signal, C-IDX signal and K-IDX signal for colors are supplied from the timing generation section 54 of FIG. 3. The LED heads each having a few thousand pixels through tens of thousands of pixels for each line are used as the LPH units 5Y, 5C, 5C and 5K, although it may vary according to the maximum width of the paper handled by the printer 100.

The rotation transmission mechanism 40 includes large-diameter gears 11Y, 11M, 11C and 11K, idle gears 12a and 12b, motor 30a and encoder 41. In this example, three photosensitive drums 1Y, 1M and 1C for Y, M and C colors are driven by a common motor 30a through a rotation transmission mechanism 40.

The large-diameter gears 11Y, 11M, 11C and 11K have diameters greater than those of the photosensitive drums 1Y, 1M, 1C and 1K for colors, and are mounted in the arrangement associated with these photosensitive drums 1Y, 1M, 1C and 1K. For example, the large-diameter gear 11Y is mounted on the photosensitive drum 1Y. Other large-diameter gears 1M, 11C and 11K are mounted in the similar manner.

The large-diameter gears 11Y and 11M are meshed with the idle gear 12a, and the large-diameter gears 11M and 11C are meshed with the idle gear 12b. The idle gear 12a and large-diameter gears 11Y and 11M, and the idle gear 12b and large-diameter gears 11M and 11C are engaged at a predetermined gear ratio.

In this example, the idle gear 12b is meshed with a motor 30a through a motor gear 13c. The motor 30a has a motor shaft 13a, and a motor gear 13c is mounted on this motor shaft 13a. The motor gear 13c and idle gear 12a are engaged at a predetermined gear ratio.

In the rotation transmission mechanism 40, when the motor 30a rotates in the counterclockwise direction, the idle gear 12b rotates in the clockwise direction according to a predetermined gear ratio. The rotation of this idle gear 12b causes the large-diameter gear 11M and large-diameter gear 11C to rotate in the counterclockwise direction at a predetermined gear ratio. The rotation of the large-diameter gear 11M causes the photosensitive drum 1M to rotate in the counterclockwise direction. Similarly, the rotation of the large-diameter gear 11C causes the photosensitive drum 1C to rotate in the counterclockwise direction.

Further, the rotation of the large-diameter gear 11M in the counterclockwise direction causes the idle gear 12a to rotate in the clockwise direction. The clockwise rotation of the idle gear 12a is accompanied by the rotation of the large-diameter gear 11Y in the counterclockwise direction. The rotation of the large-diameter gear 11Y allows the photosensitive drum 1Y to rotate in the counterclockwise direction. This arrangement allows three photosensitive drums 1Y, 1M and 1C for Y, M and C colors to be driven by one common motor 30a through the rotation transmission mechanism 40.

The photosensitive drum 1K for BK color allows the large-diameter gear 11K to be directly driven by the motor 30b in conformity to the monochromatic high-speed mode, without the intervention of an idle gear. The motor 30b has a motor shaft 13b, and a motor gear 13d is mounted on the motor shaft 13b. The motor gear 13d and large-diameter gear 11K is engaged at a predetermined gear ratio.

In this example, the encoder 41 sharing part of the function of a measurement function is mounted on the shaft of the large-diameter gear 11M for M color. The encoder 41 has the same shaft as that of the photosensitive drum 1M for M color. It detects the rotational velocity (rotary phase) of the photosensitive drum 1M for M color, and outputs the rotational velocity fluctuation signal S41. The rotational velocity signal S41 includes the velocity fluctuation distribution in one round cycle of the photosensitive drum 1M so that the velocity fluctuation distribution in one round cycle of drum can be measured from the rotational velocity fluctuation signal S41.

The encoder 41 also has a round-cycle sensor function of detecting the one-round cycle of the photosensitive drum 1M and outputting s the drum round cycle signal (hereinafter referred to as "TRIG signal"). In this manner, the encoder 41 constitutes an image forming section 80 wherein three photosensitive drums 1Y, 1M and 1C for Y-color, M-color and C-color are driven by one motor 30a, and the photosensitive drum for BK-color can be directly driven by an independent motor 30b.

Figure 9:
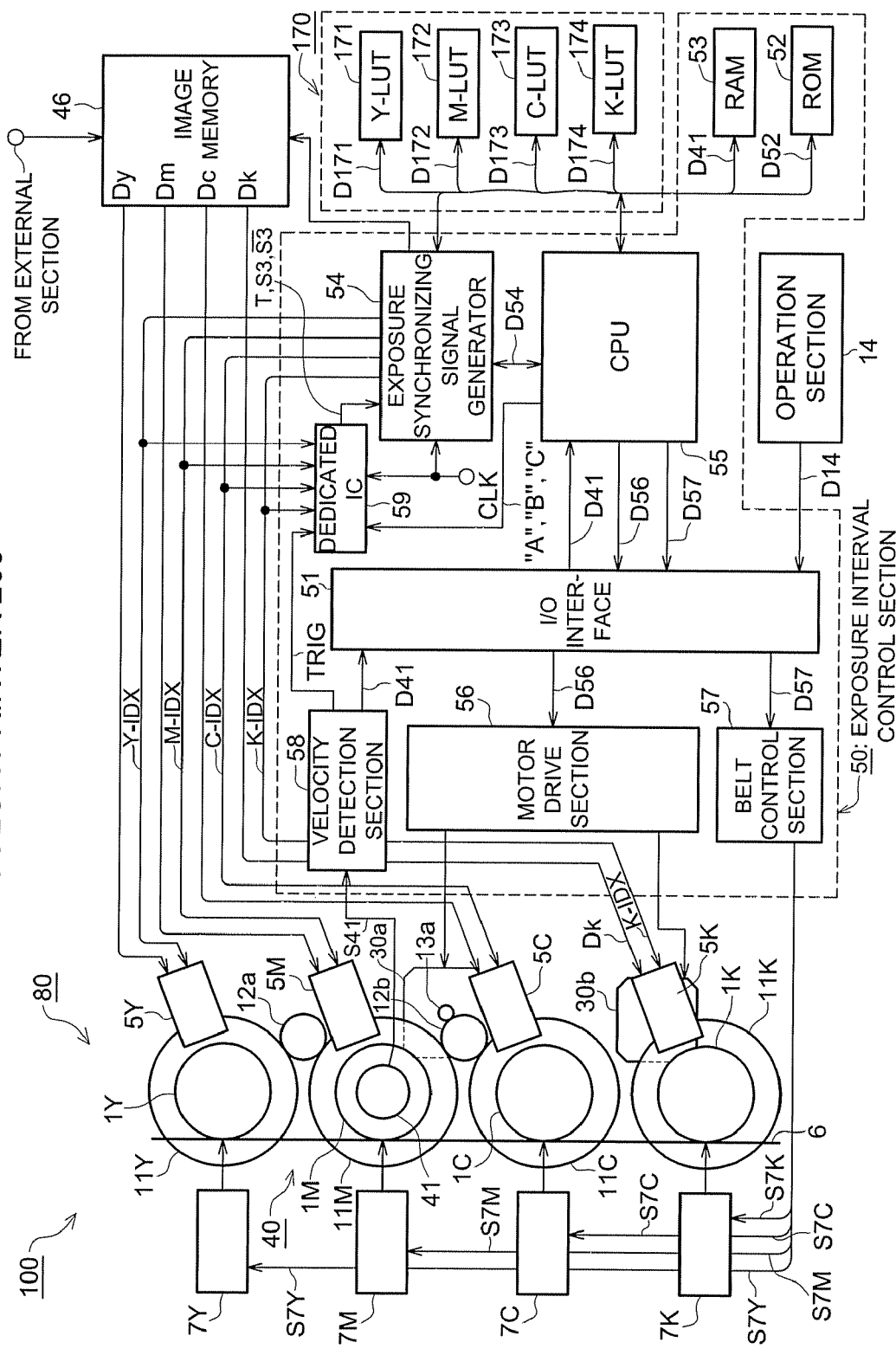
FIG. 9 is a block diagram showing the configuration example of the control system for color printer 200.

FIG. 9 is a block diagram showing the configuration example of the control system for color printer 200. In FIG. 9, the color printer 200 has an exposure interval control section 50, and is basically designed in a tandem structure wherein the rotational velocity fluctuations of the photosensitive drums 1Y, 1M, 1C and 1K are detected, and rotary angle errors are calculated. The index cycles of the LPH units 5Y, 5M, 5C and 5K are modulated, and the exposure interval on the drum surface is adjusted, whereby pitch irregularity and registration positional misalignment (low frequency) caused by eccentricity is minimized.

For example, based on the one-round-cycle-of-drum signal generated for one rotation of the photosensitive drum 1M outputted from the encoder 41 provided typically on the shaft of the photosensitive drum 1M, the exposure interval control section 50 generates the write synchronizing signals (hereinafter referred to as "Y-IDX, M-IDX, C-IDX and K-IDX signals) of the photosensitive drums 1Y, 1M, 1C and 1K for Y, M, C, and BK colors that provide the examples of the image write control signals of the corrected index cycle. The exposure interval control section 50 make comparison between the number of the correction values created according to the rotary angle error table (LUT) constituting an example of the correction data table, and the number of the correction values of the rotary angle error table to be referenced by the one-round cycle of drum, and provides control in such a way as to set the outputs of the Y-IDX, M-IDX, C-IDX and K-IDX signals of the corrected index cycle or the output of the reference index signal, based on the result of this comparison processing.

The color printer 100 includes an operation section 14 for controlling the image forming section 80, image memory 46 and exposure interval control section 50. The exposure interval control section 50 includes an I/O interface 51, ROM (Read Only Memory) 52, working RAM (Random Access Memory) 53, exposure interval synchronizing signal generator 54, CPU (Central Processing Unit) 55, motor drive section 56, belt exposure interval control section 57, velocity detecting section 58, dedicated IC 59 and storage section 170. The storage section 170 constitutes an example of the storage device, and stores the rotary angle error tables for Y, M, C, and BK colors (hereinafter referred to as "Y-LUT171, M-LUT172, C-LUT173 and K-LUT174).

The CPU 55 is connected with the ROM 52 and stores the system booting program data D52 for the overall control of the printer. The RAM 53 temporarily stores the program data D52, control commands for execution of various forms of calculation, and rotational velocity fluctuation data D41. When the CPU 55 is turned on, the system program data D52 is read into the RAM 53 from the ROM 52, whereby the system is booted, and the overall control of the printer is executed.

The CPU 55 is connected with the operation section 14 through the I/O interface 51. The rotary angle error table (LUT) creating conditions to be inputted by operation of the operation section 14, and the numeral and character operation data D14 used at the time of creating the table are inputted into the CPU 55 through the I/O interface 57.

The I/O interface 51 is connected with a motor drive section 56, belt control section 57 and velocity detecting section 58 in addition to the operation section 14. The motor drive section 56 is connected to the motors 30a and 30b, and drives the motors 30a and 30b in conformity to the motor drive information D56. The motor 30a supplies rotary force to the rotation transmission mechanism 40, and the motor 30b gives rotary force to the large-diameter gear 11K. The motor drive section 56 is connected to the CPU 55 through the I/O interface 51, and the motor drive information D56 is outputted to the motor drive section 56 from the CPU 55.

The belt control section 57 is connected with the solenoid or motor (not illustrated) for driving the primary transfer rollers 7Y, 7M, 7C and 7K. The transfer control information D57 is inputted therein to create the roller control signals S7Y, S7M, S7C and S7K. The belt control section 57 drives the primary transfer roller 7Y, for example, based on the roller control signal S7Y, and brings the intermediate transfer belt 6 in contact with the photosensitive drum 1Y, or separates the intermediate transfer belt 6 from the photosensitive drum 1Y. The primary transfer rollers 7M, 7C and 7K are also controlled in the same manner.

This arrangement brings the intermediate transfer belt 6 in contact with the photosensitive drums 1Y, 1M, 1C and 1K in one operation or separates the intermediate transfer belt 6 from the photosensitive drums 1Y, 1M, 1C and 1K in one operation. Alternatively, this arrangement brings the intermediate transfer belt 6 in contact with the photosensitive drums independently, or separates the belt from the drums independently. The belt control section 57 is connected with the CPU 55 through the I/O interface 51, and the transfer control information D57 is outputted from the CPU 55 to the belt control section 57.

The velocity detecting section 58 together with the encoder 41 provides one of the functions of the meandering device. The input side of the velocity detecting section 58 is connected to the encoder 41, and the output side thereof is connected to the CPU 55 through the I/O interface 51. A DSP (digital signal processor apparatus) or local CPU is used as the velocity detecting section 58. The encoder 41 detects the rotational velocity of the photosensitive drum 1M for M color as a reference and outputs the rotational velocity fluctuation signal S41 to the velocity detecting section 58.

In the velocity detecting section 58, the rotational velocity fluctuation signal S41 is inputted from the encoder 41 and the binarized rotational velocity fluctuation data D41 is outputted to the CPU 55. The rotational velocity fluctuation data D41 includes the rotational velocity fluctuation distribution in the one-round cycle of drum of the photosensitive drum 1M. The rotational velocity fluctuation distribution in the one-round cycle of drum can be identified from the rotational velocity fluctuation data D41. Further, the velocity detecting section 58 inputs the rotational velocity fluctuation signal S41, and samples the one-round cycle of the photosensitive drum 1M, whereby the drum round cycle signal (hereinafter referred to as "TRIG signal") generated at every rotation of the photosensitive drum 1M is sampled.

The velocity detecting section 58 is connected with the dedicated IC 59 so as to bypass the I/O interface 51. To share the load of the function of the CPU 55 and signal generating means, the velocity detecting section 58 operates in such a way that the TRIG signal, Y-IDX signal, M-IDX signal, C-IDX signal, K-IDX signal and CLK signal are inputted, and the non-reversal address error signal S3, reversal address error signal S3 bar (upper line omitted) and reference cycle T are outputted. The address error signal S3 is asserted when the number of the correction values in this table is smaller than the number of the correction values in the rotary angle error table referenced in one round cycle of drum in the rotary angle error table for each image forming color stored in the storage section 170 (FIG. 4).

The dedicated IC 59 controls the synchronizing signal generator 54 for exposure in such a way that, when the TRIG signal denoting the terminal period of the one-round cycle of drum has been inputted within a predetermined sampling period, and the TRIG signal denoting the terminal period of the one-round cycle of drum has not been inputted within this sampling period, switching from the exposure interval having been determined to the reference exposure interval is determined, and the output of the reference index signal is set. The synchronizing signal generator 54 for exposure constitutes an example of the function of the signal generating means. The exposure interval having been determined in the sense in which it is used here refers to the interval wherein the photosensitive drum 1M is subjected to exposure by the M-IDX signal of the corrected index cycle when the reference index signal is corrected, using the amount of correction that offsets the irregularity in rotational velocity fluctuation of the photosensitive drum 1M. Further, the reference exposure interval refers to the interval of exposure by the reference index signal.

The CPU 55 is connected with the exposure interval synchronizing signal generator 54. The CPU 55 references the rotary angle error table for each image forming color of the storage section 170 corrects the reference cycle T of the reference index signal for each block of the photosensitive drum 1Y and others, and outputs the image write control signal of the corrected index cycle. For example, the exposure interval synchronizing signal generator 54 generates the reference index signal and the write synchronizing signal for each image forming color in conformity to the clock signal (hereinafter referred to as "CLK signal"), non-reversal address error signal S3, reversal address error signal S3, reference cycle T and timing control information D54.

The reference index signal is created by dividing the frequency of the CLK signal. The exposure interval synchronizing signal generator 54 corrects the reference index signal using the correction value read out of the storage section 170, and generates the Y-IDX, M-IDX, C-IDX and K-IDX signals serving as the write synchronizing signals for each image forming color. The CLK signal is supplied from a clock generator (not illustrated). The timing control information D54 includes the command for determining the exposure interval in the photosensitive drums 1Y, 1M, 1C and 1K for Y, M, C, and BK colors. The timing control information D54 is supplied from the CPU 55 to the exposure interval synchronizing signal generator 54.

The Y-IDX signal is a signal for authorizing the collective exposure for each line based on the Y-color image data Dy. The M-IDX signal is a signal for authorizing the collective exposure for each line based on the M-color image data Dm. The C-IDX signal is a signal for authorizing the collective exposure for each line based on the C-color image data Dc. The K-IDX signal is a signal for authorizing the collective exposure for each line based on the BK-color image data Dk.

The exposure interval synchronizing signal generator 54 is connected with four LPH units 5Y, 5M, 5C and 5K. The LPH units 5Y, 5M, 5C and 5K are connected with the image memory 46. The LPH unit 5Y operates in such a way that as to collectively write one line or several line of the Y-colored image data Dy read out of the image memory 46 in the main scanning direction of the photosensitive drum 1Y, based on the Y-IDX signal outputted from the exposure interval synchronizing signal generator 54.

Similarly, the LPH unit 5M operates in such a way as to collectively write one line or several line of the M-colored image data Dm in the main scanning direction of the photosensitive drum 1M, based on the M-IDX signal. The LPH unit 5C operates in such a way as to collectively write one line or several line of the C-colored image data Dc in the main scanning direction of the photosensitive drum 1C, based on the C-IDX signal. the LPH unit 5K operates in such a way as to collectively write one line or several line of the BK-colored image data Dk in the main scanning direction of the photosensitive drum 1K, based on the K-IDX signal.

The CPU 55 has an information creating function. The CPU 55 inputs the rotational velocity fluctuation data D41 from the velocity detecting section 58, and creates the rotary angle fluctuation table of the photosensitive drum 1M and the rotary angle error table (image formation timing correction table). The M-color rotary angle fluctuation table can be defined as an information reference table indicating the fluctuation of the rotary angle between the primary transfer position for superimposing colored images on the intermediate transfer belt 6 and the exposure position for forming colored images on the photosensitive drum 1M. Further, the rotary angle error table for M color can be defined as an information reference table for correcting the colored image formation timing in the exposure position corresponding to the aforementioned the primary transfer position.

The CPU 55 creates the rotary angle error table of the photosensitive drums 1Y and 1C except for the reference photosensitive drum 1M driven by the motor 30a through the rotation transmission mechanism 40, in response to the rotational velocity fluctuation data D41 of the reference photosensitive drum 1M. For example, the CPU 55 operates in such a way to ensure that the transfer function leading from the large-diameter gear 11M of the M-color reference photosensitive drum 1M to the Y-color photosensitive drum 1Y driven by the motor 30a through the rotation transmission mechanism 40 is calculated into the rotational velocity fluctuation data D41, whereby the rotary angle error table of the Y-color photosensitive drum 1Y is created. Here the Y-color rotary angle error table can be defined as the information reference table for correcting the colored image formation timing at the exposure position for forming colored images on the photosensitive drum 1Y corresponding to the primary transfer position wherein the colored images are superimposed on the intermediate transfer belt 6.

The rotary angle error table for C color is defined as the information reference table for correcting the colored image formation timing at the exposure position for forming colored images on the photosensitive drum 1C corresponding to the primary transfer position for superimposing the colored images on the intermediate transfer belt 6. The rotary angle error table for B and K colors is defined as the information reference table for correcting the colored image formation timing at the exposure position for forming colored images on the photosensitive drum 1K corresponding to the primary transfer position for superimposing the colored images on the intermediate transfer belt 6.

The CPU 55 detects the presence or absence of a TRIG signal input within a predetermined sampling period (period corresponding to the one-round cycle of drum), and determines the exposure interval of the LPH units 5Y, 5M, 5C and 5K, based on the information on the presence or absence of this TRIG signal. The CPU 55 further controls the exposure interval of the LPH units 5Y, 5M, 5C and 5K in conformity to the correction data D171, D172, D173, D174 on the rotary angle error table.

For example, in the rotary angle error table for Y, M, C, and BK colors stored in the storage section 170, comparison is made between the number of the correction values for the table for the image forming color, and the number of the correction values of the rotary angle error table for the color to be referenced by the one-round cycle of drum. The synchronizing signal generator 54 for exposure is controlled in such a way as to set the outputs of the Y-IDX, M-IDX, C-IDX and K-IDX signals of the corrected index cycle and/or the output of the reference index signal, based on the result of this comparison processing.

The aforementioned CPU 55 is connected with the storage section 170. The storage section 170 includes a nonvolatile memory (hereinafter referred to as "Y-LUT171") for storing the Y-color rotary angle error table; a nonvolatile memory (hereinafter referred to as "M-LUT172") for storing the rotary angle error table for M color; a nonvolatile memory (hereinafter referred to as "C-LUT173") for storing the rotary angle error table for C color; and a nonvolatile memory (hereinafter referred to as "K-LUT174") for storing the rotary angle error table for B and K colors. They are connected to the synchronizing signal generator 54 for exposure.

It goes without saying that the present invention is not restricted thereto. It is also possible to arrange such a configuration that, in one nonvolatile memory, the memory area is divided for four Y-LUT171, M-LUT172, C-LUT173 and K-LUT174, and the rotary angle error table for each color is stored. The storage section 170 can be structured using a register array and HDD (hard Disk Driver, in addition to the nonvolatile memory.

Each rotary angle error table stores the data for correcting the exposure interval at the time of forming each colored image in conformity to the rotational velocity fluctuation distribution. The rotary angle error table is created by the information creating function of the CPU 55, in conformity to the rotational velocity fluctuation data D41 of the velocity detecting section 58.

The Y-LUT171 stores the Y-color rotary angle error table wherein the correction values for establishing association with the velocity fluctuation distribution of the one-round cycle of drum measured by the encoder 41 are found for each block, and are associated with each other; the aforementioned correction values being the Y-color correction values for correcting the reference cycle T of the reference index signal. The correction values of the Y-color rotary angle error table as the Y-color correction data D171 are read out of the Y-LUT171 into the synchronizing signal generator 54 for exposure.

Similarly, the M-LUT172 stores the M-color rotary angle error table wherein the correction values for establishing association with the velocity fluctuation distribution of the one-round cycle of drum measured by the encoder 41 are found for each block, and are associated with each other; the aforementioned correction values being the M-color correction values for correcting the reference cycle T of the reference index, signal. The correction values of the M-color rotary angle error table as the M-color correction data D172 are read out of the M-LUT172 into the synchronizing signal generator 54 for exposure.

The C-LUT173 stores the C-color rotary angle error table wherein the correction values for establishing association with the velocity fluctuation distribution of the one-round cycle of drum measured by the encoder 41 are found for each block, and are associated with each other; the aforementioned correction values being the C-color correction values for correcting the reference cycle T of the reference index signal. The correction values of the C-color rotary angle error table as the C-color correction data D173 are read out of the C-LUT173 into the synchronizing signal generator 54 for exposure.

The K-LUT174 stores the BK-color rotary angle error table wherein the correction values for establishing association with the velocity fluctuation distribution of the one-round cycle of drum measured by the encoder 41 are found for each block, and are associated with each other; the aforementioned correction values being the BK-color correction values for correcting the reference cycle T of the reference index signal. The correction values of the BK-color rotary angle error table as the BK-color correction data D174 are read out of the K-LUT174 into the synchronizing signal generator 54 for exposure. By referencing the aforementioned rotary angle error table, it is possible to maintain the rotational velocity fluctuation distribution for one round cycle of the photosensitive drum 1M and others.

The exposure interval synchronizing signal generator 54 is connected with the image memory 46 in addition to four LPH units 5Y, 5M, 5C and 5K. For example, the digital image data Dy, Dm, Dc and Dk received from the outside is stored therein. Such a nonvolatile memory as a hard disk (HDD) and EEPROM is used as the image memory 46. The aforementioned four Y-LUT171, M-LUT172, C-LUT173 and K-LUT174 can be assigned to The memory area of the image memory 46 and can be stored therein.

This arrangement ensures that the Y-IDX, M-IDX, C-IDX and K-IDX signals of corrected index cycle outputted to the image forming section 80 from the synchronizing signal generator 54 for exposure, or/and, reference index signal are set for each block, thereby forming a colored image based on the digital image data Dy, Dm, Dc and Dk.

Figure 10:
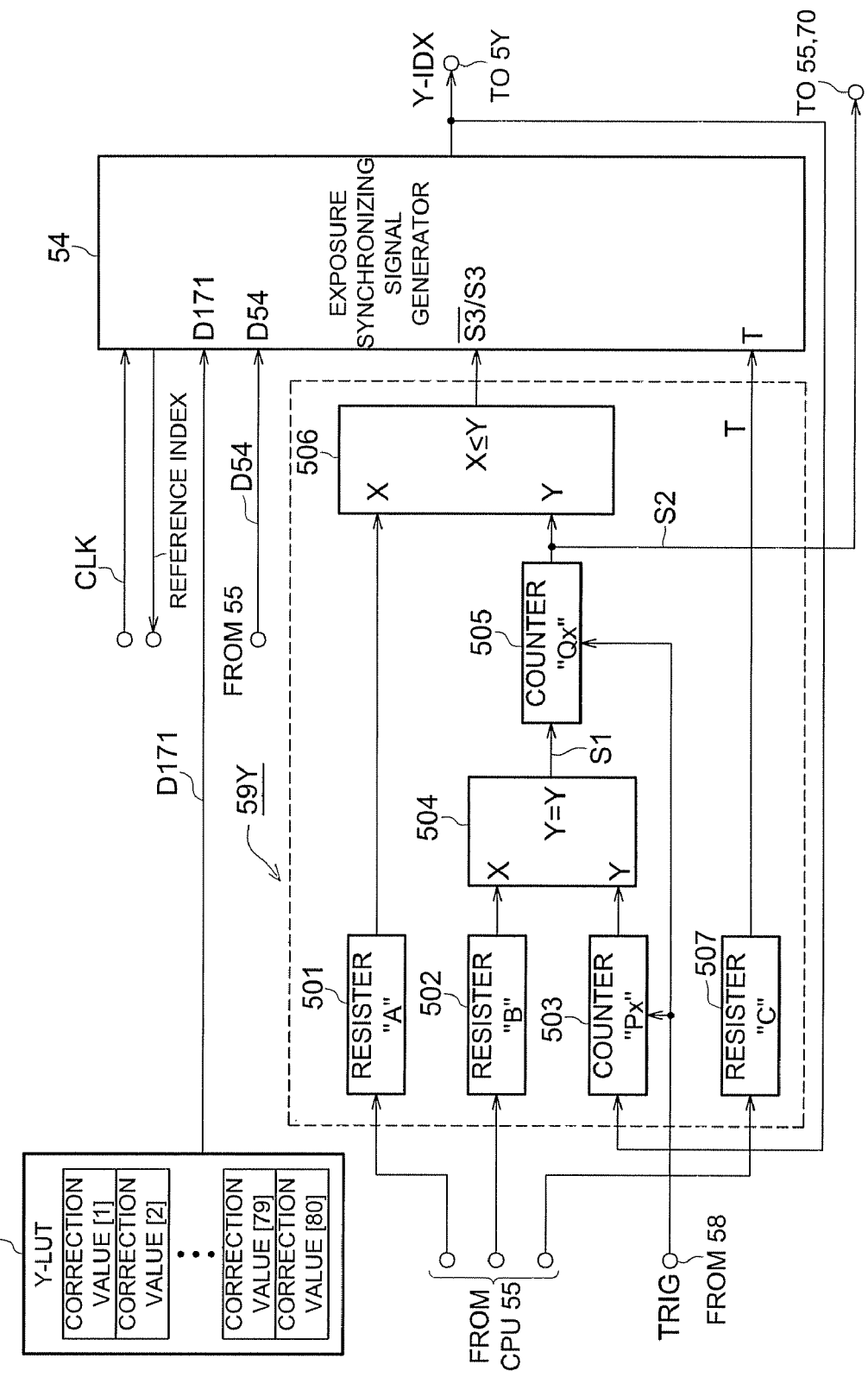
FIG. 10 is a block diagram showing the configuration example of internal/peripheral sections of a dedicated IC 59Y.

FIG. 10 is a block diagram showing the configuration example of internal/peripheral sections of a Y-colored dedicated IC 59Y. The dedicated IC 59 of FIG. 9 is divided into the four circuit blocks for generating the write synchronizing signal for each image forming color. This example will be described with reference to the Y-color exposure control system. The same structure is used for M, C, and BK colors. The Y-color exposure control system of FIG. 10 includes the synchronizing signal generator 54 for exposure shared among various image forming colors: semiconducting integrated circuit for Y-color exposure control (hereinafter referred to as "dedicated IC 59Y"): and Y-LUT171.

The synchronizing signal generator 54 for exposure is connected with a storage section 170 constituting the Y-LUT171. The Y-LUT171 contains a rotary angle error table. The rotary angle error table stores the correction value to correct the reference cycle T of the reference index signal, this value being the correction value for establishing association with the velocity fluctuation distribution of the one-round cycle of drum measured by the encoder 41. The correction value is obtained for each block and is associated for each block. The rotary angle error table contains the correction values [1] through [80] associated with 80 blocks, for example. The number of blocks can be 100, without being restricted to 80. In this case, the correction values [1] through 100] are stored therein.

The dedicated IC 59Y incorporates a register 501 for setting the correction value, a register 502 for setting the reference period, a counter 503 for counting the Y-IND pulses, a comparator 504 for agreement detection, a counter 505 for agreement counting, a comparator 506 for error detection and a register 507 for setting the reference cycle.

The number "A" of the correction values prepared in the rotary angle error table of the Y-LUT171 is set on the register 501. The number "A" of the correction values constitutes a rotary angle error table per round cycle of drum. For example, it denotes the number of the blocks obtained by dividing the photosensitive drum 1Y and others. The number "A" of the correction values is set on the register 501 by the CPU 55. The register 501 outputs the set value X="A". The register 501 is connected with the comparator 506. The "B" is set on the register 502 wherein "B" references (uses) the correction value of one rotary angle error table on a continuous basis as a reference value for exposure interval correction. The "B" denotes the number of lines exposed during the period corresponding to the block divided into "n". The "B" as the number of lines is set on the register 502 by the CPU 55. The register 502 outputs the set value X="B" to the comparator 504.

During the formation of an image, the counter 503 references the TRIG signal and counts the exposure operations of the LPH unit 5Y. For example, the counter 503 inputs the pulse-waveform Y-IDX signal as an output of the synchronizing signal generator 54 for exposure and the TRIG signal as the output of the velocity detecting section 58. Then the counter 503 counts the number Px (the number of pulses) of the cycles (index cycles) of the Y-IDX signal, and outputs the count Y. The counter 503 is cleared to zero when the TRIG signal is inputted, and then counts up. A line counter is used as the counter 503. In this example, the counter 503 counts the lines "B", and is cleared at every detection of one block.

The register 502 and counter 503 are connected with a comparator 504. The set value X and count Y are inputted to the comparator 504. For example, the set value X="B" entered in the register 502 is inputted into the comparator 504, and the number Px of the index cycle of the Y-IDX signal is inputted as a count Y. The comparator 504 compares the set value X="B" of the register 502 with the count Y=Px of the counter 503. Upon detection of X=Y, the comparator 504 generates a number agreement signal S1. The number agreement signal S1 is a signal notifying that one block has been detected, and is outputted to the counter 505.

The comparator 504 is connected with a counter 505. It counts the occurrences Qx of the number agreement signal S1 and generates a table address signal S2. This table address signal S2 determines the reading of the rotary angle error table, and is outputted to the CPU 55 and storage section 170. The CPU 55 detects the rotational phase of the photosensitive drum 1Y from the output of the counter 505, and determines the exposure interval by referencing the rotary angle error table corresponding thereto. The timing control information D54 based on this decision is outputted to the synchronizing signal generator 54 for exposure.

In this example, the counter 505 is cleared to zero when the TRIG signal is inputted. After that, the counter 505 counts up the number agreement signals S1 outputted from the comparator 504. A block counter is used as the counter 505. The counter 505 counts the occurrences Qx of the number agreement signal S1 and is cleared to zero according to the rise of the TRIG signal at every detection of one round cycle of drum.

The counter 505 and the aforementioned register 501 are connected with a comparator 506. The set value X and count Y are inputted to the comparator 506. For example, the number "A"=X of the correction values in the Y-color rotary angle error table prepared in the Y-LUT171 is inputted into the comparator 506, and the number Qx=Y of the correction values of the Y-color rotary angle error table to be referenced during one round cycle of drum is inputted into the comparator 506.

The comparator 506 makes a comparison between the number "A"=X of the correction values of the Y-color rotary angle error table prepared in the Y-LUT171, this number being the output of the register 501, and the numbers Qx=Y of the correction values in the Y-color rotary angle error table referenced in one round cycle of drum, this number being the output of the counter 505. If there is agreement between the set value X of the register 501 and the count Y of the counter 505 (X=Y) as a result of comparison processing, or if when the count Y of the counter 505 is smaller than the set value X="A", the non-reversal address error signal S3 is outputted to the synchronizing signal generator 54 for exposure.

The non-reversal address error signal S3 is a signal indicating that the Y-color rotary angle error table contains a correction value to be referenced. The synchronizing signal generator 54 for exposure wherein the non-reversal address error signal S3 has been inputted continues to set the output of the Y-IDX signal of the corrected index cycle. this arrangement allows the Y-IDX signal of the corrected index cycle to be set directly for each block, whereby the Y-colored image can be formed.

When the set value X of the register 501 is smaller than the count Y of the counter 505 (X<Y) as a result of the aforementioned comparison processing, the reversal address error signal S3 (upper line omitted) is outputted to the synchronizing signal generator 54 for exposure by the comparator 506. The reversal address error signal S3 indicates that the Y-color rotary angle error table does not contain a correction value to be referenced. The synchronizing signal generator 54 for exposure wherein the reversal address error signal S3 has been inputted operates in such a way that the output is switched from the Y-IDX signal of the index corrected cycle, to the reference index signal.

For example, the reference cycle T (reference index signal cycle) of the exposure interval in the photosensitive drum 1Y and others is set in the register 507 connected to the synchronizing signal generator 54 for exposure. In this example, the reversal address error signal S3 is outputted from the counter 505 to the synchronizing signal generator 54 for exposure. At the same time, the reference cycle T is supplied from the register 507.

When the dedicated IC 59Y has been formed as described above, the output can be switched from the Y-IDX signal of the corrected index cycle, to the reference index signal upon occurrence of an address error. Therefore, even when the rotational velocity of the photosensitive drum has been reduced by the image forming conditions such as the type of paper, and the one-round cycle of drum has been prolonged, the image irregularity can be maintained within the rotational velocity irregularity of the photosensitive drum 1Y, without correction failure occurring. The dedicated ICs 59M, 59C and 59K for colors M, C, and BK-color are structured in the same manner, and operate in the same manner, although they are not illustrated. Accordingly, they will not be described to avoid duplication.

Figure 11:
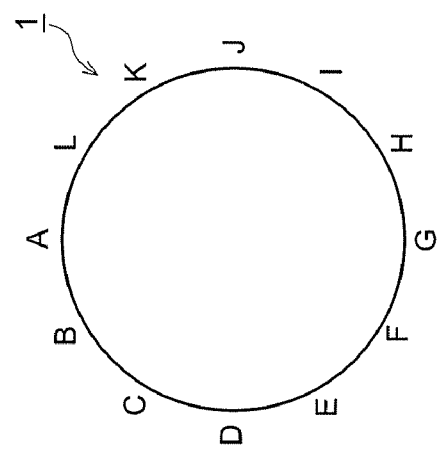
FIGS. 11 (A) and (B) are diagrams representing one cycle of photosensitive drum 1M and others, and an example of rotational velocity fluctuation thereof.
Figure 11:
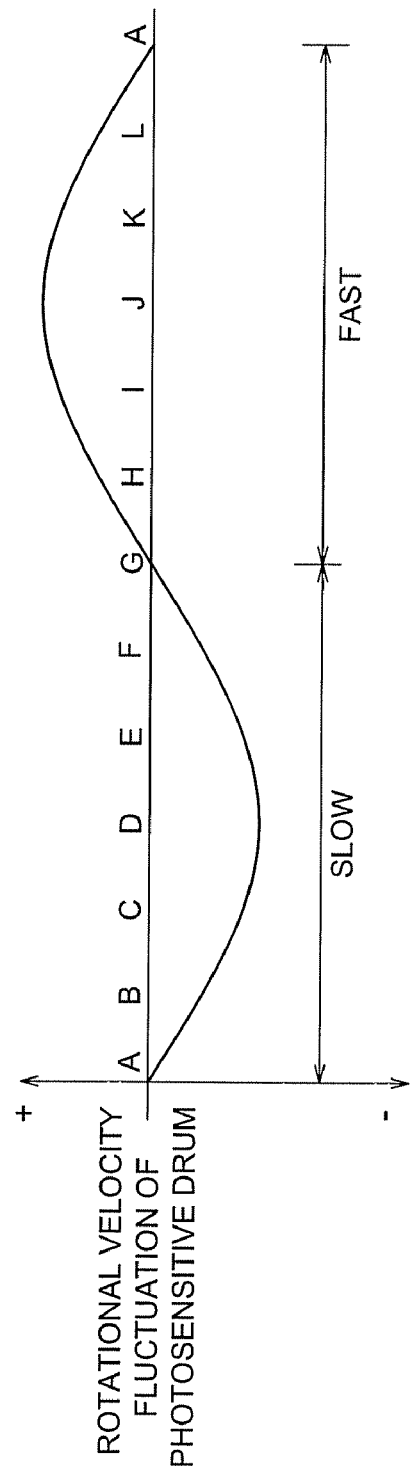
Figure 12:
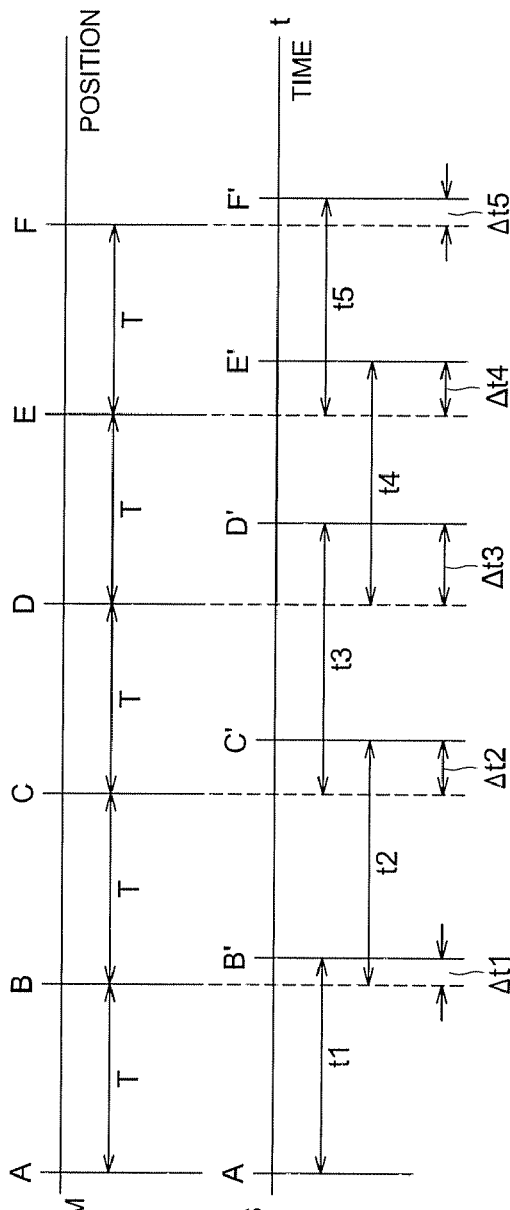
FIGS. 12 (A) and (B) are operation time charts showing the cycle correction example of reference index signal in a synchronizing signal generator 54 for exposure.

Referring to FIG. 11 and FIG. 12, the following describes an example of acquiring the rotational velocity fluctuation data D41 in the CPU 55. FIGS. 11 (A) and (B) show the peripheral length of the photosensitive drum 1M and an example of fluctuation in the rotational velocity thereof.

In this example, to obtain the rotational velocity fluctuation data D41 (Δtn), the peripheral length of the photosensitive drum 1 is divided into "N" parts, e.g., the outer periphery 360° of the photosensitive drum 1M for M color shown in FIG. 11 (A) is divided by 30° into twelve equal parts, thereby setting the point A through point L for dividing the blocks and twelve blocks indicating the sections A→B, B→C, C→D, D→E, E→F, F→G, G→H, H→I, I→J, J→K, K→L, and L→A.

The vertical axis of FIG. 11 (B) represents the fluctuations (plus/minus) in the rotational velocity of the photosensitive drum 1M and others, while the horizontal axis indicates one-round cycle of the drum. According to the example of the fluctuation in the rotational velocity of the photosensitive drum 1M and others shown in FIG. 11 (B), the rotational velocity of the photosensitive drum 1M and others is reduced by eccentricity and other factors in the section covering the first half six blocks of A→B→C→D→E→F→G. Conversely, the rotational velocity is increased in the section covering the last half six blocks of G→H→I→J→K→L→A.

FIGS. 12 (A) and (B) are the operation time charts representing an example of correcting the cycle of the reference index signal in the synchronizing signal generator 54 for exposure. The horizontal axis of FIG. 12 (A) indicates the drum position corresponding to one round cycle of the photosensitive drum 1M. In this example, it denotes the first half six blocks A→B→C→D→E→F→G of the section. "T" indicates the ideal passage time (reference index signal cycle) which is the temporal representation of the rotational velocity in passing through one block, on the assumption that there is no fluctuation in rotational velocity.

The horizontal axis of the reference index signal in FIG. 12 (B) represents time t for six blocks A→B→C→D→E→F→G of the section when the rotational velocity of FIG. 11 (B) is reduced. In this example, the point B of the block A→B section fluctuates to point B' with reference to the point A; the point C of the block B→C section fluctuates to point C' with reference to the point B; the point D of the block C→D section fluctuates to point D' with reference to the point C; the point E of the block D→E section fluctuates to point E' with reference to the point D; and the point F of the block E→F section fluctuates to point F' with reference to the point E.

In the cycle T for the points A, B, C, D, E and F in the ideal section of FIG. 12 (A), for example, the A→B' section fluctuates to cycle t1; B→C' section fluctuates to cycle t2; C→D' section fluctuates to cycle t3; D→E' section fluctuates to cycle t4; and E→F' section fluctuates to cycle t5.

In this example, the time difference between points B-B' is Δt1, the time difference between points C-C' is Δt2, the time difference between points D-D' is Δt3, the time difference between points E-E' is Δt4, and the time difference between points F-F' is Δt5, when the rotational velocity fluctuation value Δtn is considered as representing time difference (tn−T: phase difference) between the point of the section of the block on the assumption that there is no rotational fluctuation of the photosensitive drum 1M and others, and the point of the same section of the block on the assumption that there is rotational fluctuation of the photosensitive drum 1M and others. The time differences Δt1 through Δt5 constitute the rotational velocity fluctuation value Δtn.

In this example, in the synchronizing signal generator 54 for exposure, for each of the twelve blocks A→B, B→C, C→D, D→E, E→F, F→G, G→H, H→I, I→J, J→K, K→L and L→A in the section, a step is taken to obtain the difference with respect to the passage time (expected value) of the point in each section, i.e., the rotational velocity fluctuation value Δtn of FIG. 12 (B). The rotational velocity fluctuation values Δtn associated with the number of blocks are stored in the rotary angle error table of the M-LUT 172.

In the synchronizing signal generator 54 for exposure, the rotational velocity fluctuation values Δtn are read out of the rotary angle error table of the M-LUT 172, and are distributed according to the number of lines in the block. The correction value is added to or subtracted from the reference cycle T of the reference index signal, whereby the M-IDX signal of the subsequent cycle T plus-minus correction value is generated. The M-IDX signal is a write reference (synchronous) signal when an M-colored image is formed on the photosensitive drum 1M for M-color. The M-IDX signal reflects the correction time Δtn-Δtn−1 for each block.

FIGS. 13 (A) and (B) denote an example of cycle correction of the reference index signal to cancel the rotational velocity irregularity of the photosensitive drum 1M and others. FIG. 13 (A) is a waveform diagram showing an example of the fluctuation in the rotational velocity of the photosensitive drum 1M and others prior to correction. The example of the fluctuation in the rotational velocity of FIG. 13 (A) is the same as that of the fluctuation in the rotational velocity of FIG. 11 (B), and will not be described to avoid duplication.

In this example, for the section of the first half six blocks A→B→C→D→E→F→G in the example of the fluctuation in the rotational velocity of the photosensitive drum 1M and others shown in FIG. 13 (A), the photosensitive drum 1M and others rotate at a lower speed than usual, for example, by an increased load. Accordingly, correction is made by correction time Δtn-Δtn−1 in such a way that the reference cycle T of the reference index signal is set at a longer level, whereby the M-IDX signal is produced.

For the section of the last half six blocks G→H→I→J→K→L→A, conversely, the photosensitive drum 1M and others rotate at a higher speed than usual due to reduced loads. Accordingly, connection is made by the correction time Δn-Δn−1 in such a way that the reference cycle T of the reference index signal is set to a reduced level, whereby the M-IDX signal is obtained.

FIG. 13 (B) is a graph representing an example of the cycle distribution of the corrected reference index signal (M-IDX signal, etc.). The vertical axis of FIG. 13 (B) indicates the reference cycle T of the reference index signal, i.e., the correction value (plus/minus) with respect to the reference cycle T. The horizontal axis denotes the one-round cycle of drum. According to the example of the cycle distribution of the reference corrected index signal in FIG. 13 (B), the rotational velocity irregularity having a sinusoidal waveform of FIG. 13 (A) is cancelled by the cycle distribution of the reference corrected index signal formed in a sinusoidal wave as shown in FIG. 13. According to the waveform of the cycle distribution of the reference corrected index signal in this example, one block is assigned with 100 lines and the correction time Δn-Δn−1 is divided into ten parts. The reference cycle T of the reference index signal is corrected by one correction time Δn-Δn-1/10 for every ten lines, whereby the M-IDX signal is obtained.

The following describes the image forming method of the present invention with reference to an example of the operation of the exposure interval control section 50. FIGS. 14 (A) through (C) are the graphs showing an example (No. 1) of the reference index signal cycle correction in the exposure interval control section 50. The CLK of FIG. 14 (A) signifies the clock signal (sampling clock) having a predetermined sampling frequency. The TRIG of FIG. 14 (B) indicates the drum round cycle signal (TRIG signal).

FIG. 14 (C) is a chart showing an example of the relationship between the rotary angle error table for each image forming color and the TRIG signal. In this example, the TRIG signal is based on the case of sampling using the CLK signal of FIG. 14 (A). The correction value "A" is calculated with respect to the reference exposure interval (the reference cycle T of the reference index signal), whereby the exposure interval for each image forming color is corrected. The correction value "A" is set in such a way that the average value of the corrected exposure interval will be the reference exposure interval.

The vertical axis of FIG. 14 (C) denotes the exposure interval based on the reference index signal. In the diagram, "T" indicated by the horizontal broken line indicates the reference cycle of the reference index signal. The horizontal axis denotes the time for using the rotary angle error table, i.e., the TRIG signal sampling time. The "ts1" shown by the vertical broken line denotes the sampling time for the initial phase of the one-round cycle of drum (rotational period of the photosensitive drum), and the "ts2" indicates the sampling time in the terminal phase.

The solid line of the diagram indicates the waveform (hereinafter referred to as "rotational velocity fluctuation waveform") showing an example of the fluctuation in the rotational velocity of the photosensitive drum 1M, for example. In this example, the correction value is equal to the difference between the reference cycle T of the reference index signal and the rotational velocity fluctuation waveform indicated by the solid line. This difference provides the table data constituting the correction value "A" (hereinafter referred to as "correction data D172"). The correction value "A" for the one-round cycle of drum is stored in the M-LUT172 as the rotary angle error table for M color.

In this example, the TRIG signal showing the terminal phase (the next initial phase) of the one-round cycle of drum is detected (inputted) at the sampling time ts2. At this time of input, a comparison is made between the number "A"=X of the correction values of the rotary angle error table for M color prepared in the M-LUT172, and the number Qx=Y of the correction values of the rotary angle error table for M color referenced in the terminal phase of the one-round cycle of drum. If an agreement is reached between the set value X and count Y (X=Y), or if the count Y is smaller than the set value X="A", the correction value "A" prepared in the M-LUT172 can be read out without any deficiency.

This is called the state of normal reading. For the terminal phase of the one-round cycle of drum in the state of normal reading, the last correction value of the rotary angle error table for M color is referenced. For the initial phase of the next one-round cycle of drum, the first correction value of its rotary angle error table can be referenced on a continuous basis thereafter. In the state of normal reading, the non-reversal address error signal S3 is outputted to the synchronizing signal generator 54 for exposure from the comparator 506.

Figure 15:
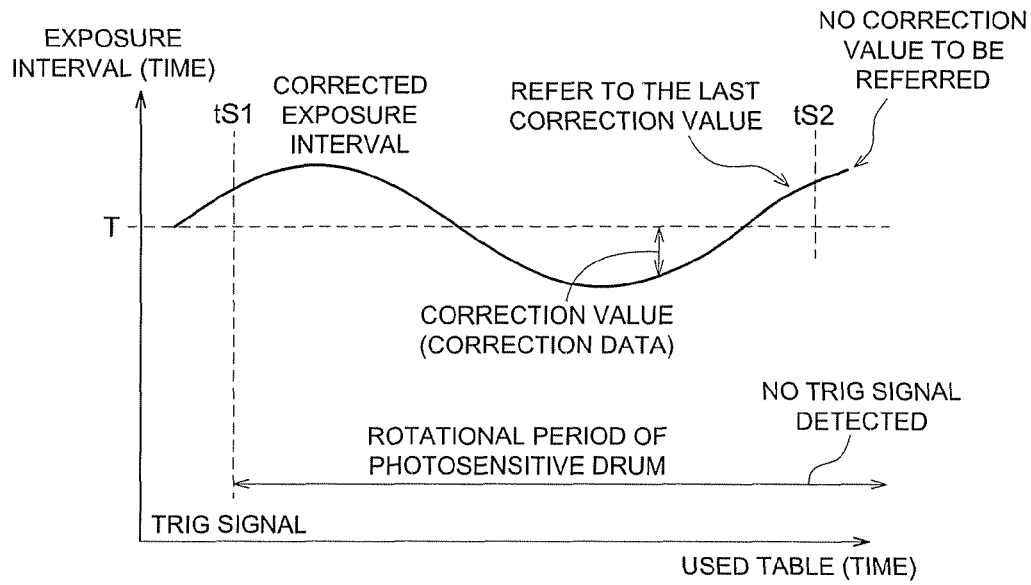
FIG. 15 is a waveform diagram showing the cycle correction example (Second example) of the reference index signal in the exposure interval control section 50.

FIG. 15 is a waveform diagram showing an example (No. 2) of the cycle correction of the reference index signal in the exposure interval control section 50.

In this example, the drum peripheral speed is reduced below the expected level and at the time of paper feeding, depending on the image forming (processing) conditions such as the selection of thick paper. The drum round cycle signal (TRIG signal) is not inputted at the expiration of the period (one round cycle of the drum) for using the last correction value "A" of the rotary angle error table for each image forming color.

In this case, even when the sampling time ts2 of FIG. 15 has been reached, the TRIG signal representing the terminal phase (next initial phase) in the one-round cycle of drum is not detected. As a result, the number "A"=X of the correction values in the rotary angle error table for M color prepared in the M-LUT172, for example, is smaller than the number Qx=Y of the correction values in the rotary angle error table for M color referenced in the terminal phase of the one-round cycle of drum (X<Y). This is called the state of faulty reading.

In the state of faulty reading, immediately before the terminal phase of the one-round cycle of drum, there is no next correction value to be referenced after the last correction value of the rotary angle error table for M color has been referenced. In the state of faulty reading, the reversal address error signal S3 (upper line omitted) is outputted to the synchronizing signal generator 54 for exposure from the comparator 506.

Figure 16:
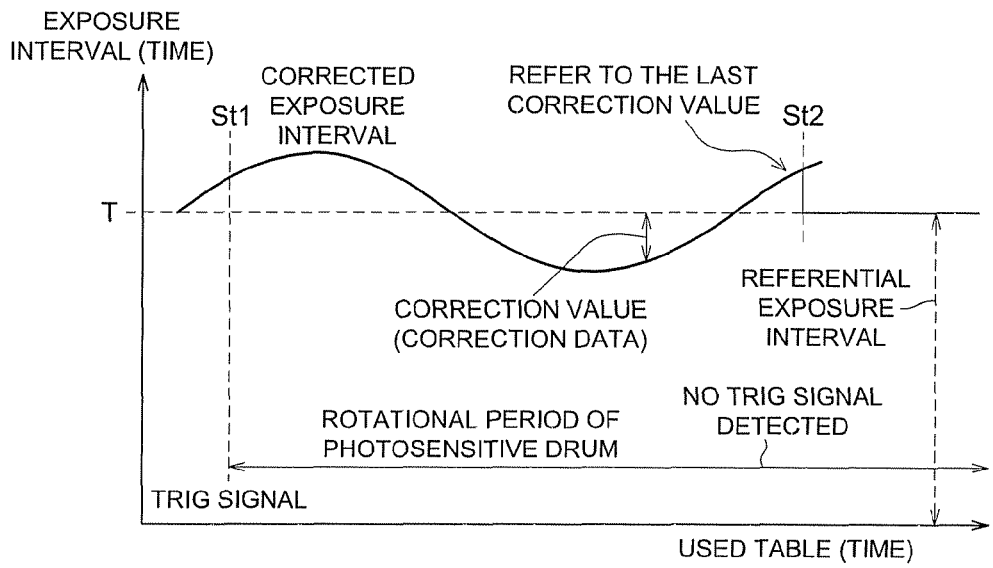
FIG. 16 is a waveform diagram showing the cycle correction example (Third example) of the reference index signal in the exposure interval control section 50.

FIG. 16 is a waveform diagram showing an example (No. 3) of the cycle correction of the reference index signal in the exposure interval control section 50.

In this example, to ensure that the state of faulty reading shown in FIG. 15 does not occur, when the number "A"=X of the correction values of the rotary angle error table for M color prepared in the M-LUT172 is smaller than the number Qx=Y of the correction values of the rotary angle error table for M color referenced in the terminal phase of the one-round cycle of drum (X<Y), for example, the synchronizing signal generator 54 for exposure wherein the reversal address error signal S3 has been inputted operates in such a way that the output is switched from the Y-IDX signal of the corrected index cycle, to the reference index signal, after having referenced the last correction value of the rotary angle error table for M color.

To be more specific, if a TRIG signal cannot be detected by referencing the correction value "A" for one round cycle of drum, the exposure interval control section 50 selects the reference exposure interval. The reference exposure interval is determined for each photosensitive drum, and can be selected for each photosensitive drum.

In the color printer 100, when there is no more correction value "A" prepared on the rotary angle error table due to reduced rotational velocity of the drum, the reference exposure interval is applied. This arrangement prevents the exposure interval from being undefined, and also prevents the exposure interval from being greatly deviated from the adequate value. Thus, the irregularity of the image can be kept within the range of irregularity in rotational velocity fluctuation.

FIG. 11 is a flow chart showing an example of the basic operation plus cycle correction in a color printer 100 as each example.

This example refers to the case wherein the reference index signal of the reference cycle T is applied for each block wherein one peripheral length of each of the photosensitive drums 1Y, 1M, 1C and 1K of the color printer 100 is divided into, for example, 80 parts, and a colored image is formed based on this reference index signal and/or Y, M, C, K-IDX signal subsequent to correction.

Figure 17:
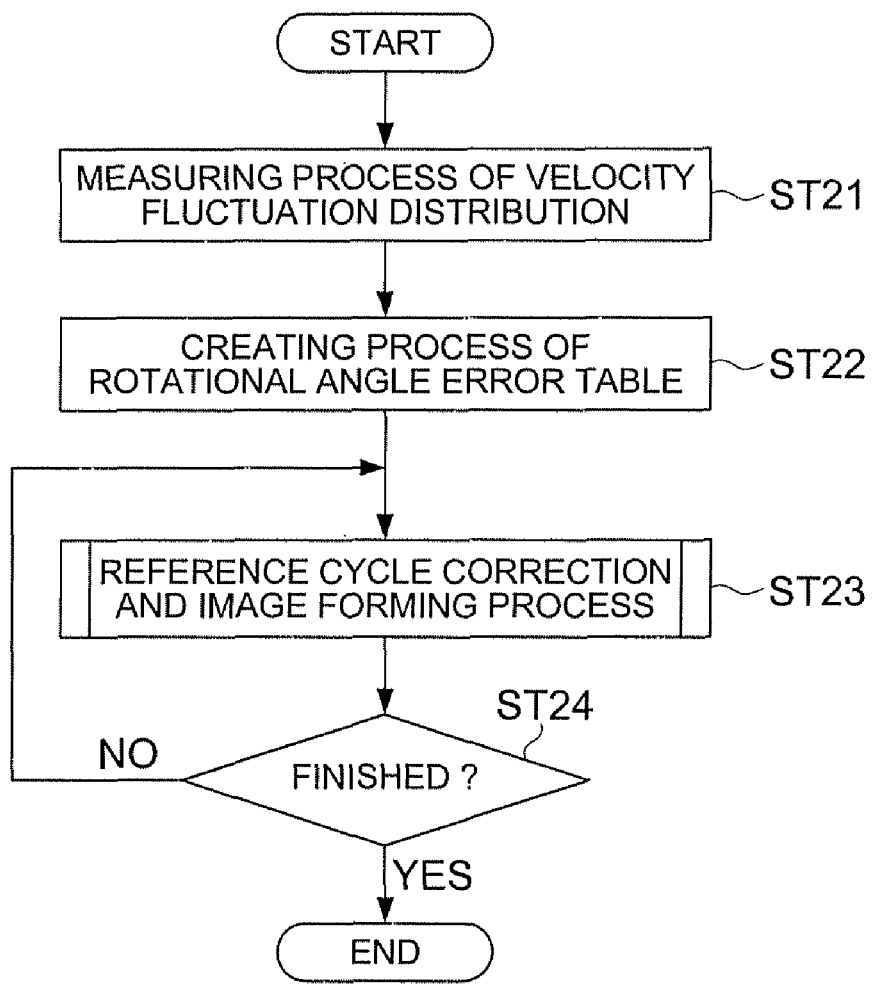
FIG. 17 is a flow chart showing the basic operation plus cycle correction example in the color printer 200 as examples.

In the first place, in the Step ST1 of the flow chart in FIG. 17, the CPU 55 detects the rotational velocity of the photosensitive drum 1M, and controls the encoder 41 and velocity detecting section 58 in such a way as to measure the distribution of velocity fluctuation in one-round cycle of drum. The encoder 41 detects the rotational velocity (phase of rotation) of the photosensitive drum 1M, and outputs the rotational velocity fluctuation signal S41 to the velocity detecting section 58. The rotational velocity fluctuation signal S41 includes the information on the distribution of the velocity fluctuation for the one-round cycle of drum of the photosensitive drum 1M. The velocity detecting section 58 measures the distribution of velocity fluctuation distribution for the one-round cycle of drum from the rotational velocity fluctuation signal S41, and the rotational velocity fluctuation data D41 formed by binarization of the rotational velocity fluctuation signal S41 is outputted to the CPU 55.

This is followed by the Step ST2 wherein the CPU 55 creates a rotary angle error table. In this case, the CPU 55 acquires the rotational velocity fluctuation data D41 shown in FIG. 17 and FIG. 12. The CPU 55 identifies the distribution of the fluctuations in rotational velocity for the one-round cycle of drum according to the rotational velocity fluctuation data D41. In this example, the correction value for establishing association with the distribution of velocity fluctuations for the one-round cycle of drum having been measured, which is the correction value for correction of the reference cycle T of the reference index signal, is obtained for each block to establish association (FIG. 17 through FIG. 13).

In the Step ST3 thereafter, the dedicated IC 59 executes correction of the reference cycle and the CPU 55 executes the image forming process. For example, the CPU 55 controls the synchronizing signal generator 54 for exposure to read out the correction data D171 from the Y-LUT171. For other colors M, C, and BK, the correction data D172 is read from the M-LUT172 into the synchronizing signal generator 54 for exposure, the correction data D173 is read from the C-LUT173 into the synchronizing signal generator 54 for exposure, and the correction data D174 is read from the K-LUT174 into the synchronizing signal generator 54 for exposure. For example, the Y-color correction data D171 read out of the Y-LUT171 contains the Y-color correction value having been read from the Y-color rotary angle error table. The CPU 55 determines the creation of the Y, M, C and K-IDX signals and controls the synchronizing signal generator 54 for exposure to generate the Y, M, C and K-IDX signals.

For example, with reference to the Y-colored image formation, the synchronizing signal generator 54 for exposure inputs the correction data D171 from the Y-LUT171 and inputs the timing control information D54 from the CPU 55. When "set value X=count Y" and "set value X<count Y" in the comparator 506 of the dedicated IC 59Y, the Y-IDX signal is outputted. In the synchronizing signal generator 54 for exposure, the reference cycle T+– correction value is calculated to generate the Y-IDX signal. The Y-IDX signal is outputted to the Y-color write unit 5Y. The operation procedure applies to the formation of images in colors M, C, and BK.

In the Y-color dedicated IC 59Y, the reference cycle T of the reference index signal is corrected for each block by referencing the previously created rotary angle error table. In this case, the dedicated IC 59Y makes a comparison between the number of the correction values of rotary angle error table having been created, and the number of the correction values of the rotary angle error table referenced in one round cycle of drum having been measured. Then the output of the Y, M, C and K-IDX signals of the corrected index cycle or the output of the reference index signal of the reference cycle T are determined based on this comparison processing (FIG. 12).

The exposure interval control section 50 controls the image forming section 80 in such a way as to set the Y, M, C and K-IDX signals (exposure interval having been determined) of the corrected index cycle for each block, to read out the data Dy, Dm, Dc and Dk from the image memory 46, and to create the colored image; or to set the reference index signal of the reference cycle T for each block and to form a colored image. The image forming section 80 sets, for each block, the Y-IDX, M-IDX, C-IDX and K-IDX signals of the corrected index cycle or reference index signal outputted from the synchronizing signal generator 54 for exposure, and forms a colored image based on the digital image data Dy, Dm, Dc and Dk.

This is followed by the Step ST4 wherein the CPU 55 determines if the image forming process has been completed or not. For example, the CPU 55 detects the end-of-flag added separately to the image data Dy, Dm, Dc and Dk. When the end-of-flag has been detected, the image forming process terminates. When the end-of-flag is not detected, the system goes back to the Step ST3 to resume the image forming process.

The basic operation plus cycle correction operation as mentioned above allows the rotational velocity of the photosensitive drum 1M and others to be reduced under the image forming conditions such as the type of sheets. Thus, even when the one-round cycle of drum has been prolonged, the image irregularity can be kept within the range of the irregularity in rotational velocity fluctuation of the photosensitive drum 1M, without any correction failure occurring.

Figure 18:
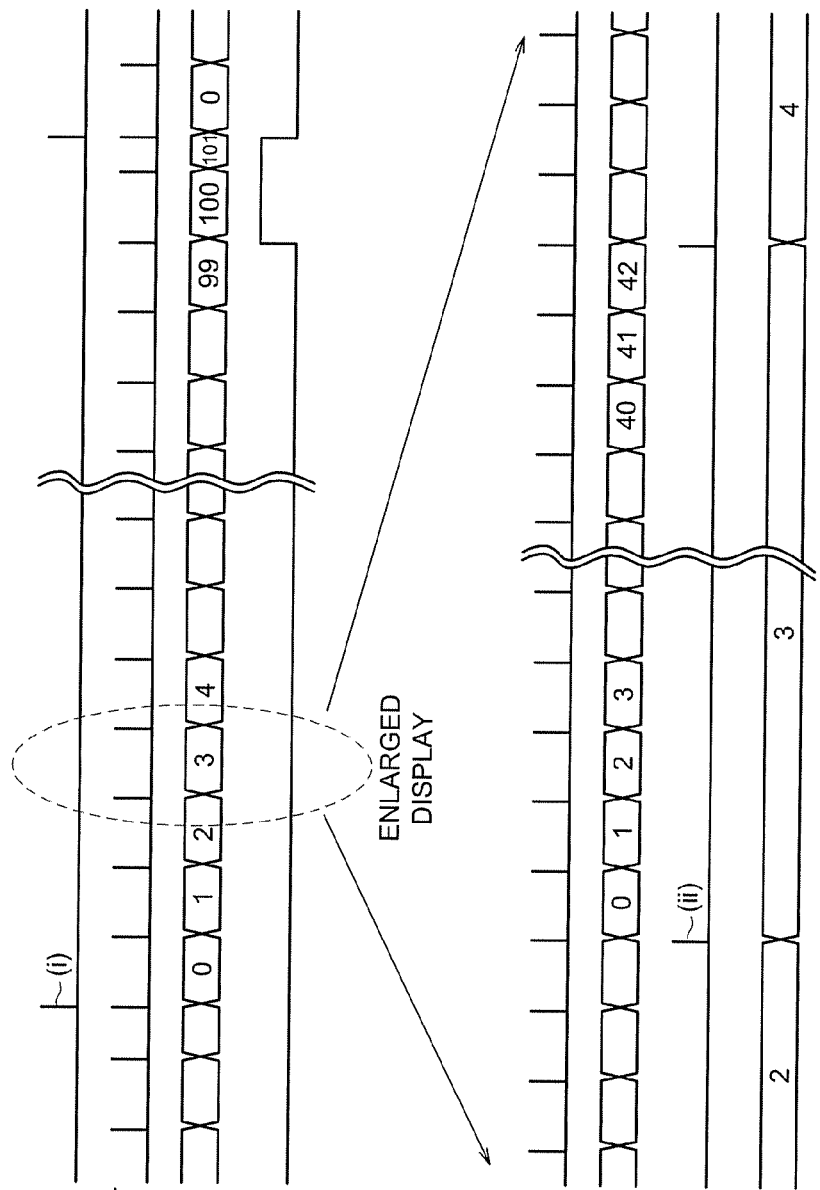
FIGS. 18 (A) through (H) are the operation time charts showing the correction and exposure control example in the reference cycle as a second example.

FIGS. 18 (A) through (H) are the operation time charts representing an example of the correction of the reference cycle and the exposure control as a second embodiment. These time charts are the waveform diagram representing an example of the correction operation of the index cycle of the Y-IDX, M-IDX, C-IDX and K-IDX signals during the image forming process in Step ST3 of FIG. 17.

This example assumes that the drum peripheral speed is reduced below the expected level at the time of paper feeding under the image forming (process) such as section of thick paper, and the drum round cycle signal (TRIG signal) is not inputted, even after the termination of the period for using the last data of the rotary angle error table. Based on this assumption, the reference exposure interval determined for each photosensitive drum is selected even when there is no more correction data prepared in the rotary angle error table. The following shows the example wherein the number of correction value "A"=the number of block "n"=100 is set on the register 501 such as a dedicated IC 59Y, and the number of lines "B"=42 is set on the register 502. The set value X="A" is set on the register 501 by the CPU 55. In the same manner, the set value X="B" is set on the register 502.

In this example, the encoder 41 detects the one-round cycle of the photosensitive drum 1M, and outputs the rotational velocity fluctuation signal S41 to the velocity detecting section 58. The velocity detecting section 58 inputs the rotational velocity fluctuation signal S41 from the encoder 4, samples the one-round cycle of the photosensitive drum 1M, and detects the TRIG signal that is generated at every rotation of the photosensitive drum 1M. The TRIG signal is outputted to the dedicated IC 59Y and others from the velocity detecting section 58, and the rotational velocity fluctuation data D4 is outputted to the CPU 55.

The aforementioned conditions are assumed as the prerequisite for the operation. When the rising edge (i) of the TRIG signal of FIG. 18 (A) has been detected, the counter value "Qx"=0 in FIG. 18 (C) is outputted to the comparator 506 from the counter 505 in the dedicated IC 59Y, triggered by this rising edge (i).

At the same time, the counter 503 of FIG. 10 starts to count the number Px of the index cycles of the Y-IDX signal shown in FIG. 18 (E), and outputs the count Y=0 as the counter value "Px" of the first block. Every time the number Px of the index cycles of the Y-IDX signal is counted sequentially, Px=1, 2, 3, ... 42 is outputted to the comparator 504. The counter 503 is cleared to zero when the TRIG signal is inputted. After that, the counter reaches the full count, and counts the number of lines "B". This counter is cleared at every counting of the block.

In the comparator 504, a comparison is sequentially made between the set value X="B" set on the register 502, and the count Y=Px=0, 1, 3, ... 42 shown in FIG. 18 (F) inputted from the counter 503, until X=Y is detected. Upon detection of X=Y, the comparator 504 generates the number agreement signal S1 shown in FIG. 18 (B). The number agreement signal S1 is outputted to the counter 505 from the comparator 504. The counter 505 counts the number Qx of occurrences of the number agreement signal S1 and outputs the number "n" of blocks.

For example, the counter value "Qx"="2" is outputted from the counter 505 to the comparator 506. After that, the counter 503 of FIG. 10 continues to count the number Px of the index cycle of the Y-IDX signal shown in FIG. 18 (E), and outputs the count Y=3 to the comparator 504 as the counter value "Px" of the third block. Then Px=42 is outputted to the comparator 504 every time the number Px of the index cycle of the Y-IDX signal is sequentially counted up.

The comparator 504 make a comparison between the set value X="B"=42 set on the register 502, and the count Y Px=42 inputted from the counter 503, and detects X=Y. Upon detection of X=Y, the comparator 504 generates the number agreement signal S1 of FIG. 18 (G) which is an enlarged version of FIG. 18 (B). In the enlarged view, "h" indicates the position close to "Qx"="2" through "4" on the counter as shown in FIG. 18 (H). The number agreement signal S1 indicates that the third block has been detected, and the result is outputted to the counter 505 from the comparator 504. The counter 505 triggers the rising edge (ii) of the number agreement signal S1, counts the number Qx of occurrences, and generates the table address signal S2. The counter 505 is cleared every time the TRIG signal is inputted. After that, the counter 505 counts up the number agreement signals S1 outputted from the comparator 504.

The table address signal S2 shows the number of blocks n="3", and is outputted to the CPU 55 and storage section 170 in addition to the comparator 506. The CPU 55 detects the phase of rotation of the photosensitive drum 1Y from the table address signal S2 of the counter 505, and determines the exposure interval by referencing the rotary angle error table conforming to that phase. Then the timing control information D54 based on this decision is outputted to the synchronizing signal generator 54 for exposure.

In this example, the comparator 506 with the set value X and count Y inputted therein makes a comparison between the number of correction values "A"=X in the Y-color rotary angle error table prepared in the Y-LUT171, and the number of correction values Qx=Y in the Y-color rotary angle error table referenced in one round cycle of drum.

If there is agreement between the set value X of the register 501 and the count Y of the counter 505 (X=Y) as a result of the aforementioned comparison processing, or if the count Y of the counter 505 is smaller than the set value X="A", the low-level non-reversal address error signal S3 of FIG. 18 (D) is outputted to the synchronizing signal generator 54 for exposure.

The non-reversal address error signal S3 indicates that the Y-color rotary angle error table contains a correction value to be referenced. The synchronizing signal generator 54 for exposure wherein the non-reversal address error signal S3 has been inputted ensures that the output of the Y-IDX signal of the corrected index cycle is kept set unchanged. Thus, the Y-IDX signal of the corrected index cycle is set for each block, whereby a Y-colored image can be formed.

Further, if the set value X of the register 501 is smaller than the count Y of the counter 505 as a result of the aforementioned comparison processing (X<Y), the comparator 506 outputs the high-level reversal address error signal S3 (upper line omitted) to the synchronizing signal generator 54 for exposure. The synchronizing signal generator 54 for exposure wherein the reversal address error signal S3 has been inputted switches the mode from the corrected index cycle to the reference cycle T. In this example, the reference cycle T is set to the synchronizing signal generator 54 for exposure from the register 507

This arrangement allows the reversal address error signal S3 to be outputted to the synchronizing signal generator 54 for exposure from the counter 505, and permits the output to be switched from the Y-IDX signal of the corrected index cycle to the reference index signal of the reference cycle T. This makes it possible to set the reference index signal of the reference cycle and to form a Y-colored image. When the next TRIG signal has been detected, the system goes back from the leading position of the rotary angle error table to the original basic operation wherein the correction value [1] has been applied.

As described above, in the color printer 200 as a second embodiment, an exposure interval control section 50 and the synchronizing signal generator 54 for exposure are provided when the reference index signal of the reference cycle T is corrected for each of the blocks obtained by dividing one round cycle of the photosensitive drums 1Y, 1M, 1C and 1K, for example, into 100 parts, and an image is formed based on the Y, M, C and K-IDX signals of the corrected index cycle. In the dedicated IC 59 of the exposure interval control section 50, if the set value X of the register 501 is smaller than the count Y of the counter 505 (X<Y), the reversal address error signal S3 (upper line omitted) is outputted to the synchronizing signal generator 54 for exposure. The synchronizing signal generator 54 for exposure wherein reversal address error signal S3 has been inputted switches the output from the Y-IDX signal of the corrected index cycle to the reference index signal of the reference cycle T.

Thus, when the number of correction values n=100 in the rotary angle error table prepared in conformity to the 100 blocks of the photosensitive drums 1Y, 1M, 1C and 1K is smaller, for example, by "100+1" than the number of the correction values wherein the rotary angle error table is to be referenced, a colored image can be formed based on the reference index signal of the reference cycle T instead of the output of the Y, M, C and K-IDX signals of the corrected index cycle.

Thus, even when the rotational velocity of the photosensitive drums 1Y, 1M, 1C and 1K has been reduced by the image forming conditions such as the type of paper, and the one-round cycle of drum has been prolonged, this arrangement prevents the exposure interval from being undefined, and prevents correction failure from occurring. Thus, the irregularity of the image can be kept within the range of irregularity in rotational velocity fluctuation of the photosensitive drums 1Y, 1M, 1C and 1K.

Third Embodiment

Figure 19:
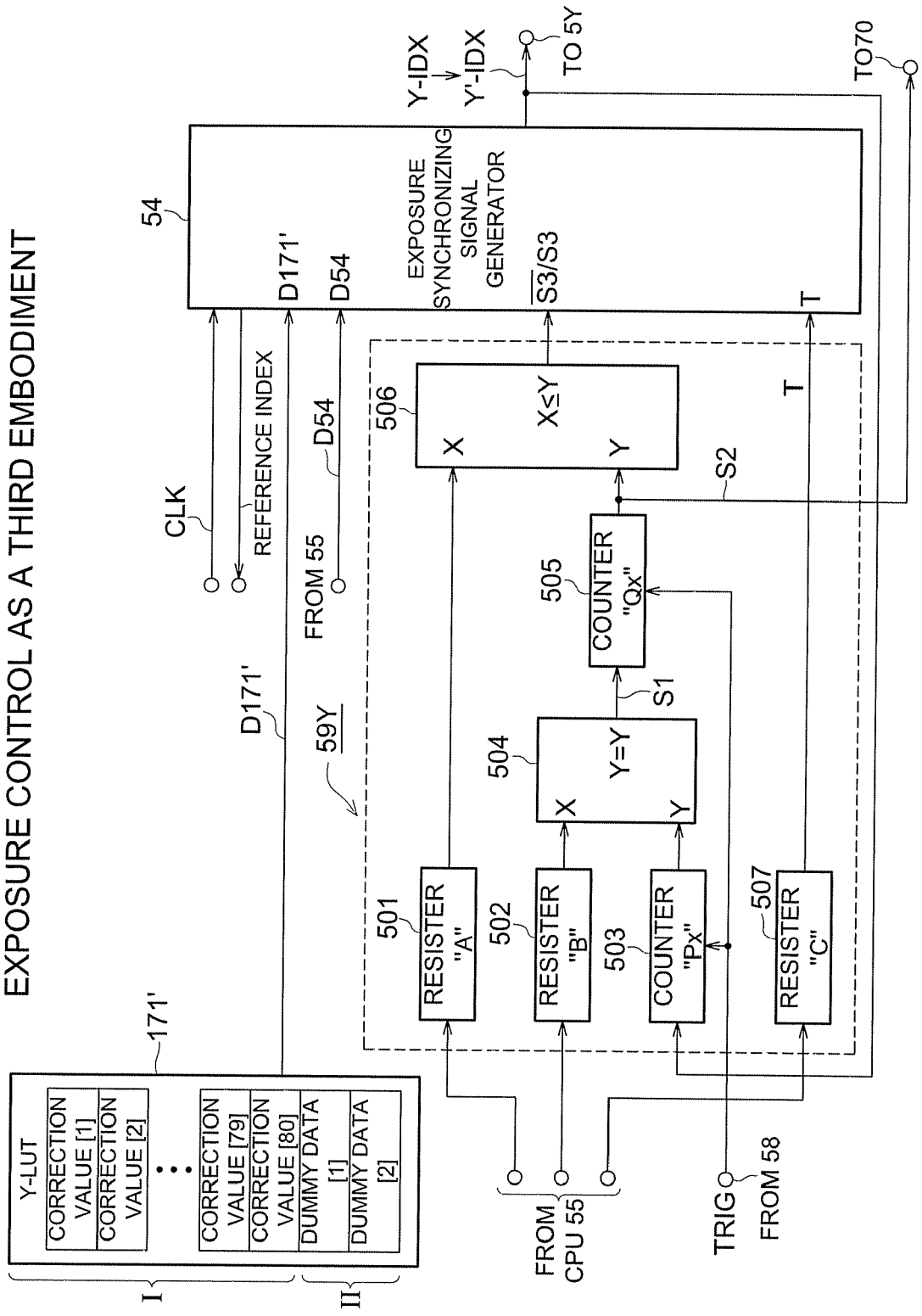
FIG. 19 is a block diagram showing the configuration example of a dedicated IC 59Y and the peripheral section thereof as a third embodiment.

FIG. 19 is a block diagram showing the configuration example of a dedicated IC 59Y and the peripheral section thereof as a third embodiment.

In this example, the first and second rotary angle error tables I and II are stored in the Y-LUT171' connected to the synchronizing signal generator 54 for exposure shown in FIG. 19.

The rotary angle error table I contains the correction value for establishing association with the distribution of velocity fluctuation during the one-round cycle of drum measured by the encoder 41, wherein the aforementioned correction value is the correction value "A" for correcting the reference cycle T of the reference index signal. The correction value "A" is obtained for each block, and is associated for each block. The rotary angle error table I stores the correction values [1] through [80] associated with 80 blocks, for example.

The rotary angle error table II is configured by setting a dummy data storage area in the last position (backward of correction value [80]) of the correction values [1] through [80] for one round cycle of the rotary angle error table I. The rotary angle error table II contains the preliminary correction value (hereinafter referred to as "dummy data") for correcting the reference cycle T of the reference index signal. The dummy data is associated with virtual block. The rotary angle error table II contains dummy data [1] and [2] associated with two virtual blocks, for example.

In this example, the Y-LUT171' is designed to have the memory capacity (quantity with safety allowance) that ensures description of dummy data. The program of calculating the dummy data does not require real-time performances. Thus, calculation can be made by software. Similarly, the rotary angle error tables I and II are loaded for the M-LUT172', C-LUT173' and K-LUT174' for colors M, C, and BK colors (not illustrated). When the Y-LUT171' has been arranged in the aforementioned manner, control is provided in such a way as to avoid abrupt exposure interval and to permit the reference exposure interval to be utilized in the final phase, despite reduction in the drum rotational velocity. Thus, the irregularity of an image can be kept within the irregularity of the velocity.

The dedicated IC 59Y of FIG. 19 makes a comparison, for the Y-colored image formation, for example, between the number of correction values [1] through [80] in the rotary angle error table I stored in the Y-LUT171', and the number of the correction values in the rotary angle error table referenced in the one-round cycle of drum, as measured by the encoder 41. If the number of the correction value "A" in the rotary angle error table I stored in the Y-LUT171' is smaller than the number of the correction values "A" in the rotary angle error table referenced in the one-round cycle of drum as a result of this process of comparison, the rotary angle error table II is referenced immediately after the rotary angle error table I.

If the number of the correction values "A" is smaller, the dedicated IC 59Y controls the synchronizing signal generator 54 for exposure in such a way that the first the Y-IDX signal of the corrected index cycle based on the rotary angle error table I is switched over to the Y'-IDX signal of the second corrected index cycle. The rotary angle error table corrects the reference cycle T of the reference index signal, using the dummy data [1] based on the rotary angle error table II associated with the virtual block.

The aforementioned arrangement of the Y-color exposure control prevents the exposure interval being subjected to a sudden change, and ensures transfer to the exposure interval based on the reference index signal of the reference cycle T in the final phase. The same reference numerals and names as those of the second embodiment have the same functions, and will not be described to avoid duplication.

Figure 20:
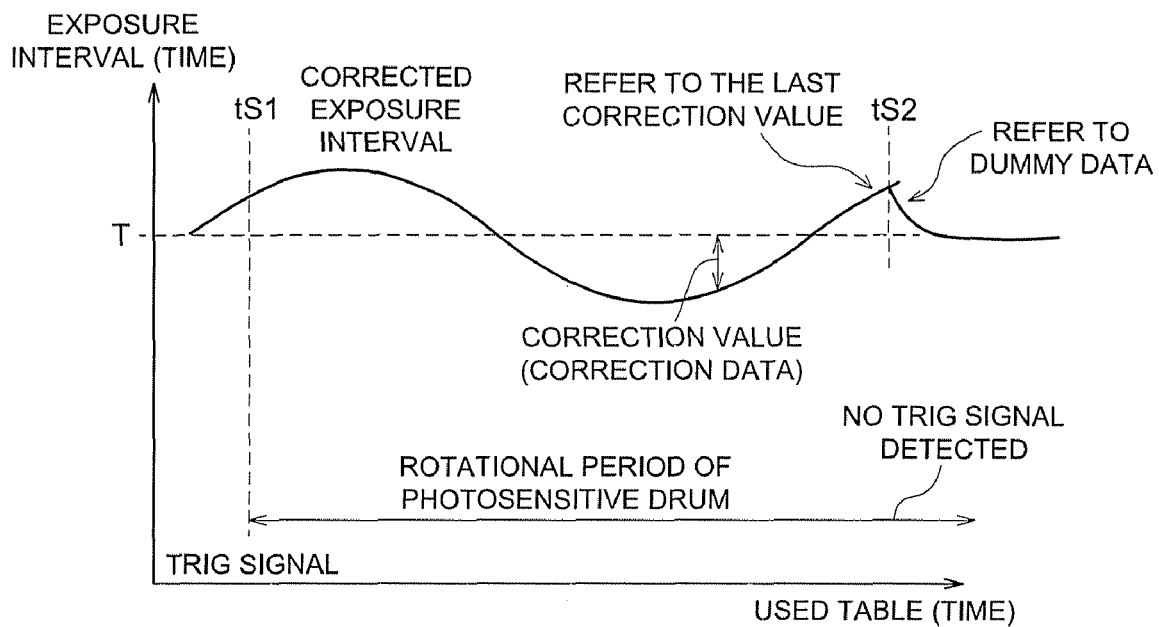
FIG. 20 is a wave form diagram showing the cycle correction example of the reference index signal as a third embodiment.

FIG. 20 is a waveform diagram showing the cycle correction example of the reference index signal as a third embodiment. In this example, immediately before the sampling time ts2 in the terminal phase of the one-round cycle of drum in FIG. 20, the last correction value of the rotary angle error table I is referenced. Exposure control is provided in such a way as to converge from the index cycle of the Y-IDX signal created by correcting the reference index signal, to the reference cycle T of the reference index signal.

In this exposure control, when no TRIG signal is detected even after the lapse of sampling time ts2 and when, for example, the number "A"=X of the correction values in the Y-color rotary angle error table created in the Y-LUT171' is smaller than the number Qx=Y of correction values in the Y-color rotary angle error table to be referenced in the terminal phase of the one-round cycle of drum (X<Y), the synchronizing signal generator 54 for exposure wherein reversal address error signal S3 has been inputted operates to switch the output from the Y-IDX signal of the corrected index cycle over to the Y-IDX signal wherein the index cycle gradually converges on the reference cycle T, after referencing the last correction value of the Y-color rotary angle error table I, for the purpose of avoiding faulty reading of FIG. 15.

In the exposure interval control section 50, when no TRIG signal is detected by referencing all the correction values "A"

in the one-round cycle of drum, the dummy data [1] and [2] corresponding to the virtual blocks are referenced from the rotary angle error table II. The dummy data [1] and [2] are used to correct the reference cycle T of the reference index signal, whereby the Y'-IDX signal is generated, and the corrected Y'-IDX signal is outputted. The dummy data [1] and [2] are determined separately for each photosensitive drum, and are selected for each photosensitive drum.

Almost the same operation as that shown in the operation time chart in the dedicated IC 59Y explained with reference to FIGS. 18 (A) through (H) is performed in the example of correction and exposure control of the reference cycle in the third embodiment. In the third embodiment, if the set value X of the register 501 is smaller than the count Y of the counter 505 (X<Y) in the comparator 506 of the dedicated IC 59Y, high-level reversal address error signal S3 (omitted) is outputted to the synchronizing signal generator 54 for exposure. However, the difference from the second embodiment is that the synchronizing signal generator 54 for exposure wherein reversal address error signal S3 has been inputted operates in such a way that the corrected index cycle gradually converges on the reference cycle T.

In this example, immediately when the reversal address error signal S3 is outputted from the counter 505 to the synchronizing signal generator 54 for exposure, there occurs a gradual transfer from the Y-IDX signal of the corrected index cycle chronological to the reference index signal of the reference cycle T. This arrangement allows the Y-colored image to be formed based on the write control signal which sets the Y-IDX signal wherein the index cycle changes gradually, without sudden changes in cycle, and is reduced to the reference index signal of the reference cycle T in the final phase.

When the next TRIG signal has been detected, the system goes back to the original basic operation wherein the correction value [1] has been applied, from the leading position of the rotary angle error table. The M-IDX signal, C-IDX signal and K-IDX signal are also formed in the same manner. Images of colors M, C, and BK can be formed by setting the reference index signal of the reference cycle after insufficiency of the correction value has occurred.

As described above, in the color printer 200 as a third embodiment, when images are to be formed based on the Y, M, C and K-IDX signals of the corrected index cycle wherein the reference index signal of the reference cycle T has been corrected for each of the blocks formed by dividing the peripheral length of each of the photosensitive drums 1Y, 1M, 1C and 1K into 80 parts, the rotary angle error tables I and II are stored in the Y-LUT171' and others connected with the synchronizing signal generator 54 for exposure.

The dedicated IC 59 makes a comparison, for the Y-colored image formation, between the number of correction values [1] through [80] in the rotary angle error table I stored in the Y-LUT171', and the number of the correction values in the rotary angle error table referenced in the one-round cycle of drum, as measured by the encoder 41. If the number of the correction value "A" in the rotary angle error table I stored in the Y-LUT171' is smaller than the number of the correction values "A" in the rotary angle error table referenced in the one-round cycle of drum as a result of this process of comparison, the rotary angle error table II is referenced immediately after the rotary angle error table I.

Accordingly, if the number of the correction values n=80 of the rotary angle error table prepared in response to 80 blocks of the photosensitive drums 1Y, 1M, 1C and 1K is smaller than the number of correction values n+α wherein this rotary angle error table is to be referenced, a colored image can be formed based on the corrected Y', M', C', K'-IDX signals wherein the reference cycle T of the reference index signal is corrected according to the dummy data [1] and [2], instead of the outputs of the Y, M, C and K-IDX signals of the corrected index cycle.

Thus, even when the rotational velocity of the photosensitive drums 1Y, 1M, 1C and 1K has been reduced by the image forming conditions such as the type of paper, and the one-round cycle of drum has been prolonged, this arrangement prevents the exposure interval from being undefined, and ensures transfer to reference exposure interval without any sudden change in the exposure interval and without deviation from the appropriate value. Thus, the irregularity of the image can be kept within the range of irregularity in rotational velocity fluctuation of the photosensitive drums 1Y, 1M, 1C and 1K.

In the image forming apparatus and image forming method of the present embodiment, a control device is provided to control the image forming device in such a way as to correct the reference signal by referencing the correction data table conforming to the type of sheets having been selected, and to form an image on the photosensitive drum based on the corrected reference signal This arrangement ensures an image to be formed on the photosensitive drum using the image write control signal of the cycle conforming to the thickness and frictional force of the transfer member. Thus, a high-quality image can be formed on the transfer sheets of various types. If there is any change in the type of sheets on the transfer member at some midpoint of the image forming process, the correction data table conforming to the type of sheets can be read out immediately. This arrangement permits continuous formation of high-quality images without further increasing the time.

The image forming apparatus of the present embodiment prevents image misalignment or line misregistration from occurring for each block formed by dividing the peripheral length of the drum into "n" parts.

The image forming apparatus of the present invention ensures the type-of-sheets information to be obtained from the status of storage onto the sheet supply tray, and allows the conforming correction data table to be read out.

In the image forming apparatus and image forming method of the present embodiment, a control device is provided to control the signal generating means for image write control signal correction. The number of correction values in the correction data table stored in the storage device is compared with the number of the correction values in the correction data table to be referenced in the one round cycle of the image carrying member, and the result of this process of comparison provides a basis for setting the output of the image write control signal of the corrected cycle or the output of the image write control signal of the reference cycle.

Thus, when the number "n" of the correction values in the correction data table prepared conforming to the "n" blocks of the image carrying member is smaller than the number "n+α" of the correction values wherein the correction data table is to be referenced, the setting can be switched to the output of the image write control signal of the reference cycle, from the output of the image write control signal of the corrected cycle. Thus, even when the rotational velocity of the image carrying member has been reduced by the image forming conditions such as the type of paper, and the one-round cycle of the image carrying member has been prolonged, this arrangement prevents correction failure from occurring, and the irregularity of the image can be kept within the range of irregularity in rotational velocity fluctuation of the image carrying member.

In the image forming apparatus of the present embodiment, if there is agreement between the number of correction values in the correction data table stored in the storage device, and the number of correction values in the correction data table to be referred in the one-round cycle of the image carrying member, the control device provides control in such a way that the output of the image write control signal of the corrected cycle continues to be set to the image forming device. This arrangement allows an image to be formed by setting the image write control signal of the corrected cycle directly for each block.

In the image forming apparatus of the present embodiment, if the number of the correction values in the correction data table stored in the storage device is smaller than the number of the correction values in the correction data table referenced in the one-round cycle of the image carrying member, the control device switches the output from the image write control signal of the corrected cycle to the image write control signal of the reference cycle. Thus, even when the rotational velocity of the image carrying member has been reduced by the image forming conditions such as the type of paper, and the one-round cycle of the image carrying member has been prolonged, this arrangement prevents correction failure from occurring, and the irregularity of the image can be kept within the range of irregularity in rotational velocity fluctuation of the image carrying member.

In the image forming apparatus of the present embodiment, if the number of the correction values in the correction data table stored in the storage device is smaller than the number of the correction values in the correction data table referenced in the one-round cycle of the image carrying member, the image write control signal of the cycle subsequent to the first correction according to the first correction data table is switched over to the image write control signal of the corrected cycle subsequent to the second correction wherein the reference cycle of the image write control signal has been corrected by the preliminary correction value based on the second correction data table conforming to the virtual block. This control prevents the exposure interval being subjected to a sudden change, and ensures transfer to the exposure interval based on the image write control signal of reference cycle in the final phase.

The present invention is most preferably applicable to a tandem system color printer, color photocopier or multi-functional peripheral which is provided with a photosensitive drum for collective exposure of an electrostatic latent image for each line from an LPH unit wherein light sources are linearly arranged for each image forming color, whereby colors are superimposed on an intermediate transfer belt to form a colored image.

What is claimed is:

1. An image forming apparatus comprising:
   an image forming section which forms an image on a photosensitive drum based on a reference signal, the reference signal being an image write control signal of a predetermined cycle;
   a measuring section which detects a rotational velocity of the photosensitive drum and measures a velocity fluctuation distribution of time period of one rotation of the drum;
   a storage section which stores a correction value in time period of one rotation of the drum as a correction data table for each type of recording sheets, wherein the correction value is obtained for each type of recording sheets based on the velocity fluctuation distribution in time period of one rotation of the drum measured by the measuring section; and
   a control section which corrects the cycle of the reference signal by referring the correction data table corresponding to a selected type of recording sheets, and controls the image forming section to form the image on the photosensitive drum based on the reference signal with the corrected cycle.

2. The image forming apparatus of claim 1, wherein the storage section stores the correction value obtained for each of blocks as a correction data table, wherein one round of the drum has been divided into "n" blocks; and
   the control section corrects the cycle of the reference signal by applying the correction value stored in the correction data table for each of the blocks.

3. The image forming apparatus of claim 1, further comprising:
   a plurality of sheet supply trays which respectively store different types of sheet; and
   a selector for selecting one sheet supply tray out of the plurality of sheet supply trays,
   wherein the control section corrects the cycle of the reference signal by referring the correction data table corresponding to the type of sheet stored in the sheet supply tray selected by the selector.

4. An image forming method for storing a correction data table created for each type of recording sheets based on measured velocity fluctuation distribution in time period of one rotation of a photosensitive drum, and forming an image on the photosensitive drum based on a reference signal which being an image write control signal of a predetermined cycle, the image forming method comprising:
   receiving an input of type of sheet information of a recording sheet for forming an image;
   referring the correction data table corresponding to the type of sheet information; and
   correcting a cycle of the reference signal based on the referred correction data table; and
   forming an image on the photosensitive drum based on the reference signal with corrected cycle.

5. The image forming method of claim 4, wherein a correction value obtained for each of blocks is stored in the correction data table, where one round of the drum has been divided into "n" blocks; and
   the cycle of the reference signal is corrected by applying the correction value stored in the correction data table for each of the blocks.

6. The image forming method of claim 4, further comprising:
   selecting a sheet supply tray out of a plurality of sheet supply trays which respectively store different types of sheet; and
   correcting the cycle of the reference signal based on the correction data table corresponding to the type of sheet stored in the selected sheet supply tray.

7. An image forming apparatus for forming an image based on a reference signal which being an image write control signal of a predetermined cycle, the image forming apparatus comprising:
   a measuring section which detects a rotational velocity of an image carrying member, and measures a velocity fluctuation distribution of the image carrying member in time period of one rotation for each of blocks obtained by dividing one round of the image carrying member into "n" blocks;
   a storage section which stores a correction value obtained for each of the blocks in a correction data table associating each of the blocks with the correction value, wherein the correction value is obtained based on the velocity fluctuation distribution of the image carrying member in time period of one rotation measured by the measuring section;

a signal creating section which refers the correction data table stored by the storage section, corrects a reference cycle of the reference signal based on the correction value for each of the blocks, and outputs the reference signal with the corrected cycle;

an image forming section which forms an image by setting the reference signal with the corrected cycle for each of the blocks, the reference signal being outputted from the signal creating section; and a control section which compares the number of the correction values in the correction data table stored in the storage section with the number of the correction values in the correction data table to be referred in time period of one rotation of the image carrying member, and based on a result of the comparison, controls the signal creating section to set the output of the reference signal with the corrected cycle or to set the output of the reference signal with the reference cycle.

8. The image forming apparatus of claim 7, wherein the control section controls the signal creating section to keep the setting of output of the reference signal with the corrected cycle, when the number of the correction values in the correction data table stored in the storage section coincides with the number of the correction values in the correction data table to be referred in time period of one rotation of the image carrying member as a result of the comparison.

9. The image forming apparatus of claim 7, wherein the control section controls the signal creating section to switch the setting of the output from the reference signal with the corrected cycle to the reference signal with the reference cycle, when the number of the correction values in the correction data table stored in the storage section is less than the number of the correction values in the correction data table to be referred in time period of one rotation of the image carrying member as a result of the comparison.

10. An image forming apparatus for forming an image based on a reference signal which being an image write control signal of a predetermined cycle, image forming apparatus comprising:

a measuring section which detects a rotational velocity of an image carrying member, and measures a velocity fluctuation distribution of the image carrying member in time period of one rotation for each of blocks obtained by dividing one round of the image carrying member into "n" blocks;

a storage section which stores a correction value obtained for each of the blocks in a first correction data table associating each of the blocks with the correction value, wherein the correction value is obtained based on the velocity fluctuation distribution of the image carrying member in time period of one rotation measured by the measuring section, and stores a second correction data table where an auxiliary correction value is associated with a virtual block;

a signal creating section which refers to the first correction data table stored by the storage section, corrects a reference cycle of the reference signal based on the correction value for each of the blocks, and outputs the reference signal with the corrected cycle;

an image forming section which forms an image by setting the reference signal with the corrected cycle for each of the blocks, the reference signal being outputted from the signal creating section; and a control section which compares the number of the correction values in the first correction data table stored in the storage section with the number of the correction values in the correction data table to be referred in time period of one rotation of the image carrying member, and in cases where the number of the correction values in the first correction data table is less than the number of the correction values in the correction data table to be referred in time period of one rotation of the image carrying member as a result of the comparison, controls such that the signal creating section refers the second correction data table in succession to the first correction data table, and switches from the reference signal with a first corrected cycle corrected based on the first correction data table to the reference signal with a second corrected cycle corrected based on the auxiliary correction value in the second correction data table.

11. An image forming method for forming an image based on a reference signal which being an image write control signal of a predetermined cycle, the image forming method comprising:

measuring a velocity fluctuation distribution of the image carrying member in time period of one rotation for each of blocks obtained by dividing one round of the image carrying member into "n" blocks, by detecting a rotational velocity of an image carrying member;

creating a correction data table associating each of the blocks with a correction value having been obtained for each of the blocks based on the velocity fluctuation distribution of the image carrying member in time period of one rotation measured by the measuring section;

correcting a reference cycle of the reference signal for each of the blocks based on the correction data table; and forming an image by setting the reference signal with the corrected cycle for each of the blocks, wherein the step of correcting a reference cycle includes:

comparing the number of the correction values in the created correction data table with the number of the correction values in the correction data table to be referred in time period of one rotation of the image carrying member; and setting an output of the reference signal with the corrected cycle or an output of the reference signal with the reference cycle, based on a result of the comparison.

12. The image forming method of claim 11, further comprising the step of:

keeping the setting of output of the reference signal with the corrected cycle, when the number of the correction values in the correction data table stored in the storage section coincides with the number of the correction values in the correction data table to be referred in time period of one rotation of the image carrying member as a result of the comparison.

13. The image forming method of claim 11, further comprising the step of:

switching the setting of output from the reference signal with the corrected cycle to the reference signal with the reference cycle, when the number of the correction values in the correction data table stored in the storage section is less than the number of the correction values in the correction data table to be referred in time period of one rotation of the image carrying member as a result of the comparison.

14. An image forming method for forming an image based on a reference signal which being an image write control signal of a predetermined cycle, the image forming method comprising:
- measuring a velocity fluctuation distribution of the image carrying member in time period of one rotation for each of blocks obtained by dividing one round of the image carrying member into "n" blocks, by detecting a rotational velocity of an image carrying member;
- creating a first correction data table associating each of the blocks with a correction value, wherein the correction value is obtained based on the measured velocity fluctuation distribution of the image carrying member in time period of one rotation, and creating a second correction data table where an auxiliary correction value is associated with a virtual block;
- correcting a reference cycle of the reference signal based on the correction value for each of the blocks, by referring the first correction data table;
- forming an image by setting the reference signal with the corrected cycle for each of the blocks, wherein the step of correcting a reference cycle includes:
- comparing the number of the correction values in the first correction data table stored in the storage section with the number of the correction values in the correction data table to be referred in time period of one rotation of the image carrying member; and
- switching from the reference signal with a first corrected cycle corrected based on the first correction data table to the reference signal with a second corrected cycle corrected based on the auxiliary correction value in the second correction data table, by referring the second correction data table in succession to the first correction data table in cases where the number of the correction values in the first correction data table is less than the number of the correction values in the correction data table to be referred in time period of one rotation of the image carrying member as a result of the comparison.

* * * * *